US012718826B2

(12) United States Patent
Xia et al.

(10) Patent No.: US 12,718,826 B2
(45) Date of Patent: *Aug. 25, 2026

(54) AUDIO SIGNAL ENCODING AND DECODING METHOD AND APPARATUS

(71) Applicant: HUAWEI TECHNOLOGIES CO., LTD., Shenzhen (CN)

(72) Inventors: Bingyin Xia, Beijing (CN); Jiawei Li, Beijing (CN); Zhe Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 316 days.

This patent is subject to a terminal disclaimer.

(21) Appl. No.: 18/423,083

(22) Filed: Jan. 25, 2024

(65) Prior Publication Data

US 2024/0177721 A1 May 30, 2024

Related U.S. Application Data

(63) Continuation of application No. PCT/CN2022/096593, filed on Jun. 1, 2022.

(30) Foreign Application Priority Data

Jul. 29, 2021 (CN) ........................ 202110865328.X

(51) Int. Cl.

*G10L 19/022* (2013.01)
*G10L 19/008* (2013.01)
*G10L 25/30* (2013.01)

(52) U.S. Cl.

CPC .......... *G10L 19/022* (2013.01); *G10L 19/008* (2013.01); *G10L 25/30* (2013.01)

(58) Field of Classification Search

CPC ............................ G10L 19/008; G10L 19/022

See application file for complete search history.

(56) References Cited

U.S. PATENT DOCUMENTS 9,406,311 B2 * 8/2016 Ito ......................... G10L 21/038
2019/0189139 A1 * 6/2019 Sung .................. G10L 19/0204

(Continued)

FOREIGN PATENT DOCUMENTS

CN 101046963 A 10/2007
CN 102222505 A 10/2011
JP 2006201375 A 8/2006

*Primary Examiner* — Bryan S Blankenagel

(74) *Attorney, Agent, or Firm* — WOMBLE BOND DICKINSON (US) LLP

(57) ABSTRACT

Embodiments of this application disclose an audio signal encoding and decoding method, including: obtaining, based on spectra of M blocks of a current frame of a to-be-encoded audio signal, M transient state identifiers of the M blocks, where the M blocks include a first block, and a transient state identifier of the first block indicates that the first block is a transient state block, or indicates that the first block is a non-transient state block; obtaining group information of the M blocks based on the M transient state identifiers of the M blocks; performing grouping and arranging on the spectra of the M blocks based on the group information of the M blocks, to obtain a to-be-encoded spectrum of the current frame; encoding the to-be-encoded spectrum by using an encoding neural network to obtain a spectrum encoding result; and writing the spectrum encoding result into a bitstream.

18 Claims, 12 Drawing Sheets

(56) References Cited

U.S. PATENT DOCUMENTS

| | | | | |
|---|---|---|---|---|
| 2019/0370636 | A1* | 12/2019 | Isopoussu | G06N 3/0442 |
| 2020/0234720 | A1* | 7/2020 | Sung | G10L 19/04 |
| 2022/0108707 | A1* | 4/2022 | Bouthéon | G10L 19/008 |

* cited by examiner

AUDIO SIGNAL ENCODING AND DECODING METHOD AND APPARATUS

CROSS-REFERENCE TO RELATED APPLICATIONS

This application is a continuation of International Application No. PCT/CN2022/096593, filed on Jun. 1, 2022, which claims priority to Chinese Patent Application No. 202110865328.X, filed on Jul. 29, 2021. The disclosures of the aforementioned applications are hereby incorporated by reference in their entireties.

TECHNICAL FIELD

This application relates to the field of audio processing technologies, and in particular, to an audio signal encoding and decoding method and apparatus.

BACKGROUND

Audio data compression is an indispensable part of media applications such as media communication and media broadcasting. With development of a high-definition audio industry and a three-dimensional audio industry, people have increasingly high requirements for audio quality, and accordingly, an audio data amount in the media applications increases rapidly.

In a current audio data compression technology, according to a basic principle of signal processing, an original audio signal is compressed based on signal correlation in time and space, to reduce a data amount, so as to facilitate transmission or storage of audio data.

In a current audio signal encoding scheme, when an audio signal is a transient state signal, there is a problem of low encoding quality. When signal reconstruction is performed at a decoder side, a problem of a poor audio signal reconstruction effect also exists.

SUMMARY

Embodiments of this application provide an audio signal encoding and decoding method and apparatus, to improve encoding quality and an audio signal reconstruction effect.

To resolve the foregoing technical problem, embodiments of this application provide the following technical solutions.

According to a first aspect, an embodiment of this application provides an audio signal encoding method, including: obtaining, based on spectra of M blocks of a current frame of a to-be-encoded audio signal, M transient state identifiers of the M blocks, where the M blocks include a first block, and a transient state identifier of the first block indicates that the first block is a transient state block, or indicates that the first block is a non-transient state block; obtaining group information of the M blocks based on the M transient state identifiers of the M blocks; performing grouping and arranging on the spectra of the M blocks based on the group information of the M blocks, to obtain a to-be-encoded spectrum of the current frame; encoding the to-be-encoded spectrum by using an encoding neural network to obtain a spectrum encoding result; and writing the spectrum encoding result into a bitstream.

In the foregoing solution, after the M transient state identifiers of the M blocks are obtained based on the spectra of the M blocks of the current frame of the to-be-encoded audio signal, and the group information of the M blocks is obtained based on the M transient state identifiers, spectra of the M blocks in the current frame may be grouped and arranged by using the group information of the M blocks. The spectra of the M blocks are grouped and arranged, so that an arrangement sequence of the spectra of the M blocks in the current frame may be adjusted, and after the to-be-encoded spectrum of the current frame is obtained, the to-be-encoded spectrum is encoded by using an encoding neural network, to obtain a spectrum encoding result, and the spectrum encoding result may be carried by using a bitstream. Therefore, in this embodiment of this application, spectra of the M blocks can be grouped and arranged based on the M transient state identifiers in the current frame of the audio signal, so that blocks with different transient state identifiers can be grouped and arranged and encoded, thereby improving encoding quality of the audio signal.

In one embodiment, the method further includes: encoding the group information of the M blocks to obtain a group information encoding result; and writing the group information encoding result into the bitstream. In the foregoing solution, after obtaining the group information of the M blocks, the encoder side may carry the group information in the bitstream, and first encode the group information. An encoding manner used for the group information is not limited herein. By encoding the group information, the group information encoding result may be obtained. The group information encoding result may be written into the bitstream, so that the bitstream may carry the group information encoding result.

In one embodiment, the group information of the M blocks includes a group quantity or a group quantity identifier of the M blocks; the group quantity identifier indicates the group quantity; and when the group quantity is greater than 1, the group information of the M blocks further includes the M transient state identifiers of the M blocks; or the group information of the M blocks includes the M transient state identifiers of the M blocks. In the foregoing solution, the group information of the M blocks includes a group quantity or a group quantity identifier of the M blocks, the group quantity identifier indicates the group quantity, and when the group quantity is greater than 1, the group information of the M blocks further includes the M transient state identifiers of the M blocks; or the group information of the M blocks includes the M transient state identifiers of the M blocks. The group information of the M blocks may indicate a grouping status of the M blocks, so that the encoder side may use the group information to perform grouping and arranging on the spectra of the M blocks.

In one embodiment, the performing grouping and arranging on the spectra of the M blocks based on the group information of the M blocks, to obtain a to-be-encoded spectrum of the current frame includes: allocating, to a transient state group, a spectrum of a block that is in the M blocks and that is indicated by the M transient state identifiers as a transient state block, and allocating, to a non-transient state group, a spectrum of a block that is in the M blocks and that is indicated by the M transient state identifiers as a non-transient state block; and arranging the spectrum of the block in the transient state group to be before the spectrum of the block in the non-transient state group, to obtain the to-be-encoded spectrum of the current frame. In the foregoing solution, after obtaining the group information of the M blocks, the encoder side groups the M blocks based on different transient state identifiers, to obtain a transient state group and a non-transient state group, and then arranges locations of the M blocks in the spectrum of the current frame, and arrange the spectrum of the block in the transient state group to be before the spectrum of the block in the non-transient group, to obtain the to-be-encoded spectrum. That is, spectra of all transient state blocks in the to-be-encoded spectra are located before a spectrum of a non-transient state block, so that the spectra of the transient state blocks can be adjusted to a position of higher encoding importance, so that a transient state feature of an audio signal reconstructed after encoding and decoding processing by using a neural network can be better retained.

In one embodiment, the performing grouping and arranging on the spectra of the M blocks based on the group information of the M blocks, to obtain a to-be-encoded spectrum of the current frame includes: arranging a spectrum of a block that is in the M blocks and that is indicated by the M transient state identifiers as a transient state block to be before a spectrum of a block that is in the M blocks and that is indicated by the M transient state identifiers as a non-transient state block, to obtain the to-be-encoded spectrum of the current frame. In the foregoing solution, after obtaining the group information of the M blocks, the encoder side determines a transient state identifier of each of the M blocks based on the group information, and first finds P transient state blocks and Q non-transient state blocks from the M blocks, and then M=P+Q. Arrange the spectrum that is in the M blocks and that is indicated by the M transient state identifiers as transient state blocks before the spectrum that is in the M blocks and that is indicated by the M transient state identifiers as non-transient state blocks, to obtain the to-be-encoded spectrum of the current frame. In one embodiment, spectra of all transient state blocks in the to-be-encoded spectra are located before spectra of non-transient state blocks, so that the spectra of the transient state blocks can be adjusted to a position of higher encoding importance, so that a transient state feature of an audio signal reconstructed after encoding and decoding processing by using a neural network can be better retained.

In one embodiment, before the encoding the to-be-encoded spectrum by using an encoding neural network, the method further includes: performing intra-group interleaving on the to-be-encoded spectrum, to obtain intra-group interleaved spectra of the M blocks; and the encoding the to-be-encoded spectrum by using an encoding neural network includes: encoding, by using the encoding neural network, the intra-group interleaved spectra of the M blocks. In the foregoing solution, after obtaining the to-be-encoded spectrum of the current frame, the encoder side may first perform intra-group interleaving based on the grouping of the M blocks, to obtain the intra-group interleaved spectra of the M blocks. In this case, the intra-group interleaved spectra of the M blocks may be input data of the encoded neural network. Through the intra-group interleaving processing, encoding side information can be further reduced, and encoding efficiency can be improved.

In one embodiment, a quantity of blocks that are in the M blocks and that are indicated by the M transient state identifiers as transient state blocks is P, a quantity of blocks that are in the M blocks and that are indicated by the M transient state identifiers as non-transient state blocks is Q, and M=P+Q; the performing intra-group interleaving on the to-be-encoded spectrum includes: interleaving spectra of the P blocks to obtain interleaved spectra of the P blocks; and interleaving spectra of the Q blocks to obtain interleaved spectra of the Q blocks. The encoding, by using the encoding neural network, the intra-group interleaved spectra of the M blocks includes: encoding, by using the encoding neural network, the interleaved spectra of the P blocks and the interleaved spectra of the Q blocks. In the foregoing solution, the interleaving the spectra of the P blocks includes interleaving the spectra of the P blocks as a whole. Similarly, the interleaving the spectra of the Q blocks includes interleaving the spectra of the Q blocks as a whole. The encoder side may perform interleaving processing based on the transient state group and the non-transient state group respectively, to obtain a spectrum of interleaving processing of the P blocks and a spectrum of interleaving processing of the Q blocks. The interleaved spectra of the P blocks and the interleaved spectra of the Q blocks may be used as input data of the encoding neural network. Through the intra-group interleaving, encoding side information can be further reduced, and encoding efficiency can be improved.

In one embodiment, before the obtaining, based on spectra of M blocks of a current frame of a to-be-encoded audio signal, M transient state identifiers of the M blocks, the method further includes: obtaining a window type of the current frame, where the window type is a short window type or a non-short window type; and only when the window type is the short window type, performing the operation of obtaining, based on spectra of M blocks of a current frame of a to-be-encoded audio signal, M transient state identifiers of the M blocks. In the foregoing solution, in this embodiment of this application, the foregoing encoding scheme may be executed only when the window type of the current frame is the short window type, to implement encoding when the audio signal is the transient state signal.

In one embodiment, the method further includes: encoding the window type to obtain an encoding result of the window type; and writing the encoding result of the window type into the bitstream. In the foregoing solution, after obtaining the window type of the current frame, the encoder side may carry the window type in the bitstream, and encode the window type first. An encoding manner used for the window type is not limited herein. By encoding the window type, the window type encoding result may be obtained. The window type encoding result may be written into the bitstream, so that the bitstream may carry the window type encoding result.

In one embodiment, the obtaining, based on spectra of M blocks of a current frame of a to-be-encoded audio signal, M transient state identifiers of the M blocks includes: obtaining M pieces of spectrum energy of the M blocks based on the spectra of the M blocks; obtaining an average spectrum energy value of the M blocks based on the M pieces of spectrum energy; and obtaining the M transient state identifiers of the M blocks based on the M pieces of spectrum energy and the average spectrum energy value. In the foregoing solution, after obtaining the M pieces of spectrum energy, the encoder side may average the M spectrum energy values to obtain an average spectrum energy value, or remove a maximum value or several maximum values from the M pieces of spectrum energy, and then average the M pieces of spectrum energy to obtain an average spectrum energy value. The spectrum energy of each block in the M pieces of spectrum energy is compared with an average spectrum energy value, to determine a change of a spectrum of each block compared with a spectrum of another block in the M blocks, and further obtain the M transient state identifiers of the M blocks, where a transient state identifier of one block may be used to indicate a transient state feature of one block. In this embodiment of this application, the transient state identifier of each block may be determined based on the spectrum energy of each block and the average spectrum energy value, so that the transient state identifier of one block can determine the group information of the block.

In one embodiment, when spectrum energy of the first block is greater than K times of the average spectrum energy value, the transient state identifier of the first block indicates that the first block is a transient state block; or when spectrum energy of the first block is less than or equal to K times of the average spectrum energy value, the transient state identifier of the first block indicates that the first block is a non-transient state block. K is a real number greater than or equal to 1. In the foregoing solution, a process of determining the transient state identifier of a first block in the M blocks is used as an example. When spectrum energy of the first block is greater than K times of the average spectrum energy value, it indicates that a spectrum change of the first block is excessively large compared with the another block in the M blocks. In this case, the transient state identifier of the first block indicates that the first block is a transient state block. When spectrum energy of the first block is less than or equal to K times of the average spectrum energy value, it indicates that the spectrum of the first block does not change greatly compared with the another block in the M blocks, and the transient state identifier of the first block indicates that the first block is a non-transient state block.

According to a second aspect, an embodiment of this application further provides an audio signal decoding method, including: obtaining group information of M blocks of a current frame of an audio signal from a bitstream, where the group information indicates M transient state identifiers of the M blocks; decoding the bitstream by using a decoding neural network, to obtain decoded spectra of the M blocks; performing inverse grouping and arranging on the decoded spectra of the M blocks based on the group information of the M blocks, to obtain inverse grouping arranged spectra of the M blocks, and obtaining a reconstructed audio signal of the current frame based on the inverse grouping arranged spectra of the M blocks.

In the foregoing solution, the group information of the M blocks of the current frame of the audio signal is obtained from the bitstream, and the group information indicates M transient state identifiers of the M blocks; decoding a bitstream by using a decoding neural network to obtain decoded spectra of M blocks; performing inverse grouping and arranging on the decoded spectra of the M blocks based on the group information of the M blocks, to obtain the spectra of the inverse grouping and arranging processing of the M blocks, and obtaining a reconstructed audio signal of the current frame based on the spectra of the inverse grouping and arranging processing of the M blocks. Because the spectrum encoding result included in the bitstream is arranged by group, decoded spectra of the M blocks may be obtained when the bitstream is decoded, and then spectra of the M blocks may be obtained by performing inverse grouping and arranging, to obtain the reconstructed audio signal of the current frame. During signal reconstruction, inverse grouping and arranging and decoding may be performed based on blocks with different transient state identifiers in the audio signal, so that an audio signal reconstruction effect can be improved.

In one embodiment, before the performing inverse grouping and arranging on the decoded spectra of the M blocks based on the group information of the M blocks, the method further includes: performing intra-group de-interleaving on the decoded spectra of the M blocks, to obtain intra-group de-interleaved spectra of the M blocks. The performing inverse grouping and arranging on the decoded spectra of the M blocks based on the group information of the M blocks includes: performing inverse grouping and arranging on the intra-group de-interleaved spectra of the M blocks based on the group information of the M blocks.

In one embodiment, a quantity of blocks that are in the M blocks and that are indicated by the M transient state identifiers as transient state blocks is P, a quantity of blocks that are in the M blocks and that are indicated by the M transient state identifiers as non-transient state blocks is Q, and M=P+Q. The performing intra-group de-interleaving on the decoded spectra of the M blocks includes: de-interleaving on decoded spectra of the P blocks; and de-interleaving on decoded spectra of the Q blocks.

In one embodiment, a quantity of blocks that are in the M blocks and that are indicated by the M transient state identifiers as transient state blocks is P, a quantity of blocks that are in the M blocks and that are indicated by the M transient state identifiers as non-transient state blocks is Q, and M=P+Q. The performing inverse grouping and arranging on the decoded spectra of the M blocks based on the group information of the M blocks includes: obtaining indexes of the P blocks based on the group information of the M blocks; obtaining indexes of the Q blocks based on the group information of the M blocks; and performing inverse grouping and arranging on the decoded spectra of the M blocks based on the indexes of the P blocks and the indexes of the Q blocks.

In one embodiment, the method further includes: obtaining a window type of the current frame from the bitstream, where the window type is a short window type or a non-short window type; and only when the window type of the current frame is the short window type, performing the operation of obtaining group information of the M blocks of a current frame from a bitstream.

In one embodiment, the group information of the M blocks includes a group quantity or a group quantity identifier of the M blocks, where the group quantity identifier indicates the group quantity, and when the group quantity is greater than 1, the group information of the M blocks further includes the M transient state identifiers of the M blocks; or the group information of the M blocks includes the M transient state identifiers of the M blocks.

According to a third aspect, an embodiment of this application further provides an audio signal encoding apparatus, including:

- a transient state identifier obtaining module, configured to obtain, based on spectra of M blocks of a current frame of a to-be-encoded audio signal, M transient state identifiers of the M blocks, and the M blocks include a first block, and a transient state identifier of the first block indicates that the first block is a transient state block, or indicates that the first block is a non-transient state block;
- a group information obtaining module, configured to obtain group information of the M blocks based on the M transient state identifiers of the M blocks;
- a grouping and arranging module, configured to perform grouping and arranging on the spectra of the M blocks based on the group information of the M blocks, to obtain a to-be-encoded spectrum; and
- an encoding module, configured to: encode the to-be-encoded spectrum by using an encoding neural network to obtain a spectrum encoding result; and write the spectrum encoding result into a bitstream.

In the third aspect of this application, composition modules of the audio signal encoding apparatus may further perform the operations described in the first aspect and the possible embodiments. For details, refer to the foregoing descriptions of the first aspect and the possible embodiments.

According to a fourth aspect, an embodiment of this application further provides an audio signal decoding apparatus, including:

a group information obtaining module, configured to obtain group information of M blocks of a current frame of an audio signal from a bitstream, where the group information indicates M transient state identifiers of the M blocks;

a decoding module, configured to decode the bitstream by using a decoding neural network, to obtain decoded spectra of the M blocks;

an inverse grouping and arranging module, configured to perform inverse grouping and arranging on the decoded spectra of the M blocks based on the group information of the M blocks, to obtain inverse grouping arranged spectra of the M blocks; and an audio signal obtaining module, configured to obtain a reconstructed audio signal based on the inverse grouping arranged spectra of the M blocks.

In the fourth aspect of this application, composition modules of the audio signal decoding apparatus may further perform the operations described in the first aspect and the possible embodiments. For details, refer to the foregoing descriptions of the first aspect and the possible embodiments.

According to a fifth aspect, an embodiment of this application provides a computer-readable storage medium. The computer-readable storage medium stores instructions. When the instructions run on a computer, the computer is enabled to perform the method according to the first aspect or the second aspect.

According to a sixth aspect, an embodiment of this application provides a computer program product including instructions. When the computer program product runs on a computer, the computer is enabled to perform the method in the first aspect or the second aspect.

According to a seventh aspect, an embodiment of this application provides a computer-readable storage medium, including the bitstream generated according to the method in the first aspect.

According to an eighth aspect, an embodiment of this application provides a communication apparatus. The communication apparatus may include an entity such as a terminal device or a chip, and the communication apparatus includes a processor and a memory. The memory is configured to store instructions. The processor is configured to execute the instructions in the memory, so that the communication apparatus performs the method according to any one of the first aspect or the second aspect.

According to a ninth aspect, this application provides a chip system. The chip system includes a processor, configured to support an audio encoder or an audio decoder in implementing functions in the foregoing aspects, for example, sending or processing data and/or information in the foregoing methods. In an embodiment, the chip system further includes a memory, and the memory is configured to store a program instruction and data for the audio encoder or the audio decoder. The chip system may include a chip, or may include a chip and another discrete component.

It can be learned from the foregoing technical solutions that embodiments of this application have the following advantages.

In an embodiment of this application, after the M transient state identifiers of the M blocks are obtained based on the spectra of the M blocks of the current frame of the to-be-encoded audio signal, and the group information of the M blocks is obtained based on the M transient state identifiers, spectra of the M blocks in the current frame may be grouped and arranged by using the group information of the M blocks. The spectra of the M blocks are grouped and arranged, so that an arrangement sequence of the spectra of the M blocks in the current frame may be adjusted, and after the to-be-encoded spectrum of the current frame is obtained, the to-be-encoded spectrum is encoded by using an encoding neural network, to obtain a spectrum encoding result, and the spectrum encoding result may be carried by using a bitstream. Therefore, in this embodiment of this application, spectra of the M blocks can be grouped and arranged based on the M transient state identifiers in the current frame of the audio signal, so that blocks with different transient state identifiers can be grouped and arranged and encoded, thereby improving encoding quality of the audio signal.

In another embodiment of this application, the group information of the M blocks of the current frame of the audio signal is obtained from the bitstream, and the group information indicates M transient state identifiers of the M blocks. A bitstream is decoded by using a decoding neural network to obtain decoded spectra of the M blocks. Inverse grouping and arranging is performed on the decoded spectra of the M blocks based on the group information of the M blocks, to obtain the spectra of the M blocks after the inverse grouping and arranging processing are performed, and a reconstructed audio signal of the current frame is obtained based on the spectra of the M blocks after the inverse grouping and arranging is performed. Because the spectrum encoding result included in the bitstream is arranged by group, the decoded spectra of the M blocks may be obtained when the bitstream is decoded, and then spectra of the M blocks may be obtained by performing inverse grouping and arranging, to obtain the reconstructed audio signal of the current frame. During signal reconstruction, inverse grouping and arranging and decoding may be performed based on blocks with different transient state identifiers in the audio signal, so that an audio signal reconstruction effect can be improved.

DESCRIPTION OF EMBODIMENTS

Figure 1:
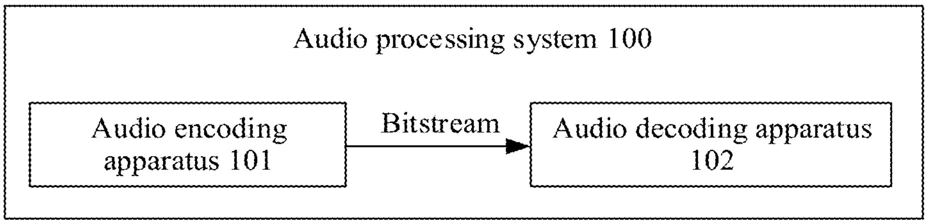
FIG. 1 is a schematic diagram of a composition structure of an audio processing system according to an embodiment of this application.

The following describes embodiments of this application with reference to accompanying drawings.

In the specification, claims, and accompanying drawings of this application, the terms “first”, “second”, and so on are intended to distinguish between similar objects but do not necessarily indicate an order or sequence. It should be understood that the terms used in such a way are interchangeable in proper circumstances, which is merely a discrimination manner that is used when objects having a same attribute are described in embodiments of this application. In addition, the terms “include”, “contain” and any other variants mean to cover the non-exclusive inclusion, so that a process, method, system, product, or device that includes a series of units is not necessarily limited to those units, but may include other units not expressly listed or inherent to such a process, method, system, product, or device.

A sound is a continuous wave generated by vibration of an object. The object that generates vibration and emits sound waves is referred to as a sound source. The sound can be sensed by an auditory organ of a person or an animal when the sound waves travel through a medium (e.g., air, solid, liquid, etc.).

Characteristics of the sound wave include a pitch, sound intensity, and a timbre. The pitch indicates a height level of the sound. The sound intensity indicates magnitude of the sound. The sound intensity can also be referred to as loudness or volume. A unit of the sound intensity is decibel (dB). The timbre is also known as a vocal quality.

A frequency of the sound wave determines the pitch. A higher frequency indicates a higher pitch. A quantity of times that an object vibrates in one second is referred to as a frequency, where a unit of the frequency is hertz (Hz). A frequency of a sound recognized by a human ear is between 20 Hz and 20,000 Hz.

An amplitude of the sound wave determines a sound intensity level. A greater amplitude indicates greater sound intensity. A shorter distance to the sound source indicates greater sound intensity.

A waveform of the sound wave determines the timbre. Waveforms of the sound wave include a square wave, a sawtooth wave, a sine wave, a pulse wave, and the like.

Based on the characteristics of the sound wave, the sound can be divided into a regular sound and an irregular sound. The irregular sound refers to a sound produced by irregular vibration of the sound source. Irregular sounds are, for example, noises that affect people’s work, study, rest, and the like. The regular sound refers to a sound produced by regular vibration of the sound source. Regular sounds include voices and music. When the sound is represented by electricity, the regular sound is an analog signal that changes continuously in time-frequency domain. The analog signal may be referred to as an audio signal. The audio signal is a type of information carrier that carries voices, music and sound effects.

Because human hearing has an ability to distinguish position distribution of sound sources in space, when hearing a sound in space, a listener can feel an orientation of the sound in addition to a pitch, sound intensity and a timbre of the sound.

The sound may alternatively be divided into a mono sound and a stereo sound. The mono has one sound channel, one microphone is used to pick up a sound, and one speaker is used to play the sound. The stereo has a plurality of sound channels, and different sound channels transmit different sound waveforms.

When the audio signal is a transient state signal, a current encoder side does not extract a transient state feature and the transient state feature is not transmitted in a bitstream, where the transient state feature indicates a change of spectra of adjacent blocks in a transient state frame of the audio signal. Therefore, when signal reconstruction is performed at a decoder side, a transient feature of a reconstructed audio signal cannot be obtained from the bitstream, and a problem of a poor audio signal reconstruction effect exists.

Embodiments of this application provide an audio processing technology, and in particular, provide an audio signal-oriented audio encoding technology, to improve a conventional audio encoding system. Audio processing includes two parts: audio encoding and audio decoding. The audio encoding is performed at a source side and includes encoding (for example, compressing) original audio to reduce a data amount required to represent the audio, to more efficiently store and/or transmit the audio. The audio decoding is performed at a target side and includes inverse processing with respect to an encoder, to reconstruct the original audio. The encoding part and the decoding part are also collectively referred to as coding. The following describes implementations of embodiments of this application in detail with reference to accompanying drawings.

The technical solutions in embodiments of this application may be applied to various audio processing systems. FIG. 1 is a schematic diagram of a composition structure of an audio processing system according to an embodiment of this application. An audio processing system 100 may include an audio encoding apparatus 101 and an audio decoding apparatus 102. The audio encoding apparatus 101 may also be referred to as an audio signal encoding apparatus, and may be configured to generate a bitstream. Then, the audio encoding bitstream may be transmitted to the audio decoding apparatus 102 through an audio transmission channel. The audio decoding apparatus 102 may also be referred to as an audio signal decoding apparatus, and may receive a bitstream. Then, an audio decoding function of the audio decoding apparatus 102 is executed, and finally, a reconstructed signal is obtained.

In this embodiment of this application, the audio encoding apparatus may be applied to various terminal devices that need audio communication, and wireless devices and core network devices that need transcoding. For example, the audio encoding apparatus may be an audio encoder of the terminal device, the wireless device, or the core network device. Similarly, the audio decoding apparatus may be applied to various terminal devices that need audio communication, and wireless devices and core network devices that need transcoding. For example, the audio decoding apparatus may be an audio decoder of the terminal device, the wireless device, or the core network device. For example, the audio encoder may include a media gateway, a transcoding device, a media resource server, a mobile terminal, a fixed network terminal, and the like in a radio access network or a core network. Alternatively, the audio encoder may be an audio encoder applied to a virtual reality (VR) streaming service.

In this embodiment of this application, an audio coding module (audio encoding and audio decoding) applicable to the virtual reality streaming (VR streaming) service is used as an example. An end-to-end encoding and decoding process of an audio signal includes: An audio preprocessing operation is performed on an audio signal A after the audio signal A is acquired by an acquisition module. The preprocessing operation includes filtering out a low-frequency part in the signal, and may be extracting orientation information in the signal by using 20 Hz or 50 Hz as a demarcation point. Then, after audio encoding and file/segment encapsulation are performed, the orientation information is delivered to a decoder side. The decoder side first performs file/segment decapsulation, then performs audio decoding, and performs audio rendering processing on a decoded signal. A signal obtained after the rendering processing is mapped to headphones of a listener. The headphone may be an independent headphone, or may be a headphone on an eyeglass device.

Figure 2A:
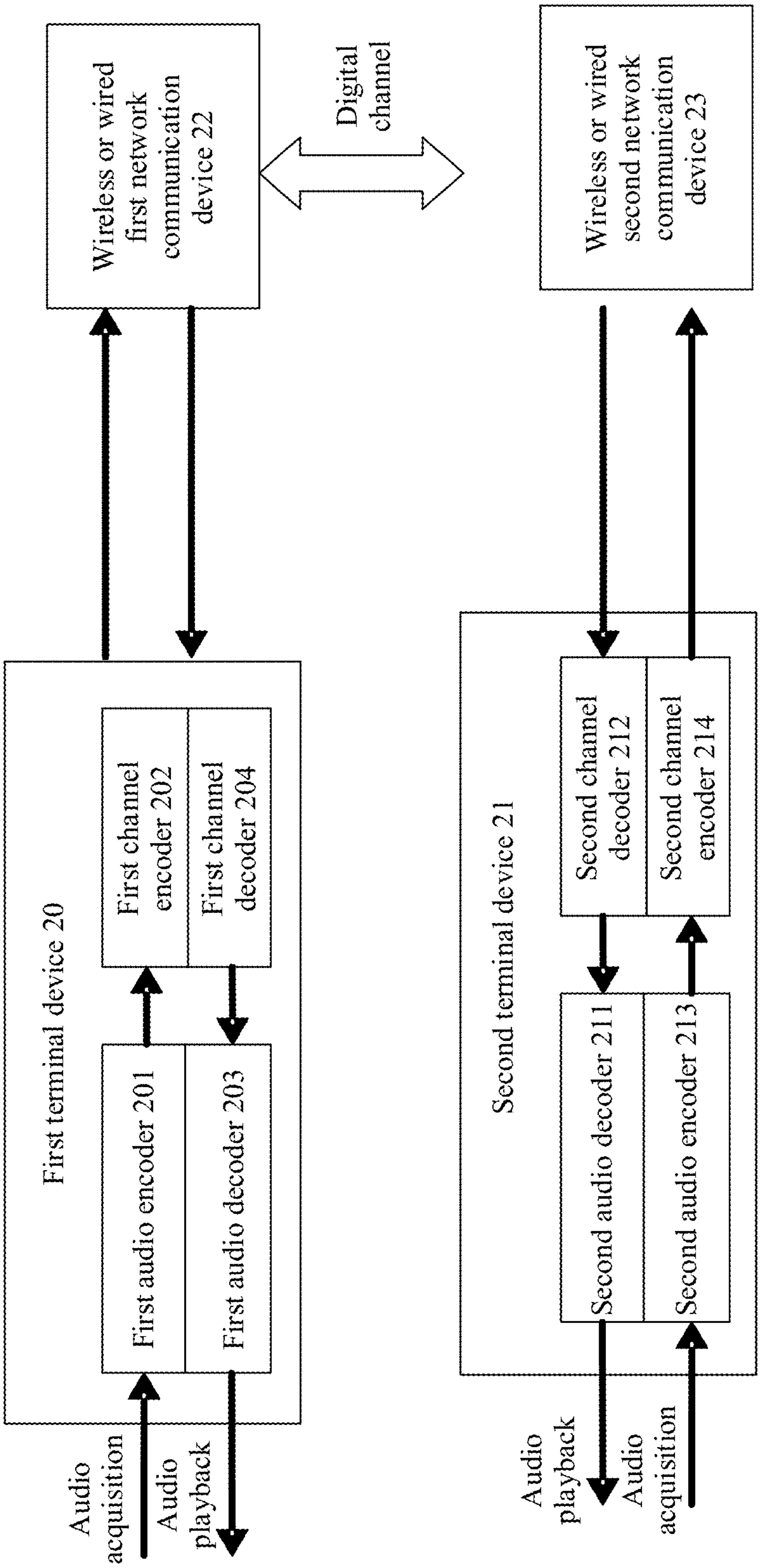
FIG. 2*a* is a schematic diagram of applying an audio encoder and an audio decoder to a terminal device according to an embodiment of this application.

FIG. 2*a* is a schematic diagram of applying an audio encoder and an audio decoder to a terminal device according to an embodiment of this application. Each terminal device may include the audio encoder, a channel encoder, the audio decoder, and a channel decoder. In one embodiment, the channel encoder is configured to perform channel encoding on an audio signal, and the channel decoder is configured to perform channel decoding on the audio signal. For example, a first terminal device 20 may include a first audio encoder 201, a first channel encoder 202, a first audio decoder 203, and a first channel decoder 204. A second terminal device 21 may include a second audio decoder 211, a second channel decoder 212, a second audio encoder 213, and a second channel encoder 214. The first terminal device 20 is connected to a wireless or wired first network communication device 22, the first network communication device 22 is connected to a wireless or wired second network communication device 23 through a digital channel, and the second terminal device 21 is connected to the wireless or wired second network communication device 23. The wireless or wired network communication device may be a signal transmission device in general, for example, a communication base station or a data switching device.

In audio communication, a terminal device used as a transmit end first performs audio acquisition, performs audio encoding and channel encoding on an acquired audio signal, and transmits the acquired audio signal in a digital channel by using a wireless network or a core network. A terminal device used as a receive end performs channel decoding based on a received signal, to obtain a bitstream, and then restores the audio signal through audio decoding, and the terminal device at the receive end performs audio playback.

Figure 2B:
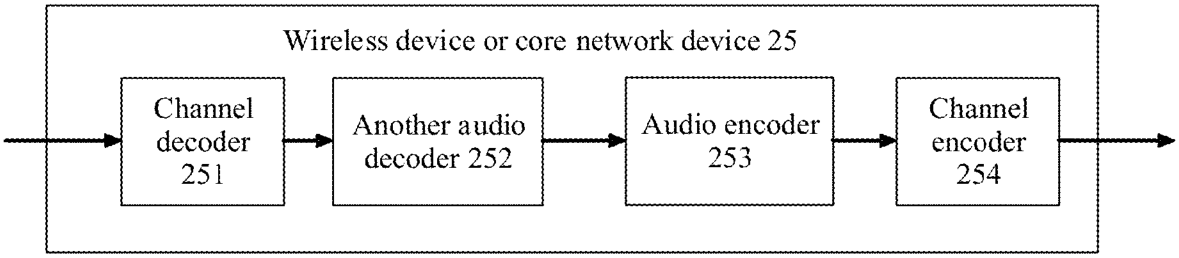
FIG. 2*b* is a schematic diagram of applying an audio encoder to a wireless device or a core network device according to an embodiment of this application.

FIG. 2*b* is a schematic diagram of applying an audio encoder to a wireless device or a core network device according to an embodiment of this application. A wireless device or core network device 25 includes a channel decoder 251, another audio decoder 252, an audio encoder 253 provided in this embodiment of this application, and a channel encoder 254. The another audio decoder 252 is an audio decoder other than the audio decoder. In the wireless device or core network device 25, the channel decoder 251 first performs channel decoding on a signal entering the device. Then, the another audio decoder 252 performs audio decoding. Then, the audio encoder 253 provided in this embodiment of this application performs audio encoding. Finally, the channel encoder 254 performs channel encoding on the audio signal. After the channel encoding is completed, the audio signal is transmitted. The another audio decoder 252 performs audio decoding on a bitstream decoded by the channel decoder 251.

Figure 2C:
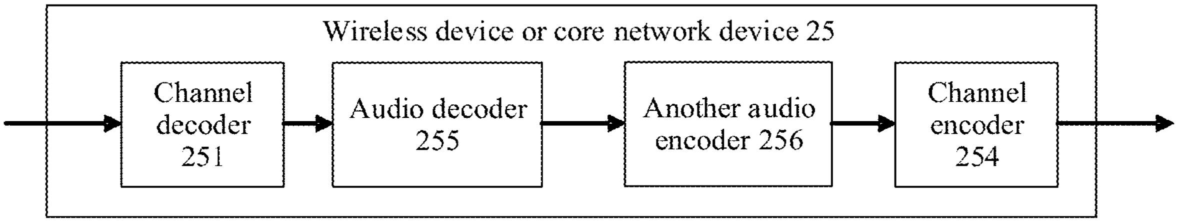
FIG. 2*c* is a schematic diagram of applying an audio decoder to a wireless device or a core network device according to an embodiment of this application.

FIG. 2*c* is a schematic diagram of applying an audio decoder to a wireless device or a core network device according to an embodiment of this application. A wireless device or core network device 25 includes a channel decoder 251, an audio decoder 255 provided in this embodiment of this application, another audio encoder 256, and a channel encoder 254. The another audio encoder 256 is an audio encoder other than the audio encoder. In the wireless device or core network device 25, the channel decoder 251 first performs channel decoding on a signal entering the device. Then, the audio decoder 255 decodes a received audio encoding bitstream. Then, the another audio encoder 256 performs audio encoding. Finally, the channel encoder 254 performs channel encoding on the audio signal. After the channel encoding is completed, the audio signal is transmitted. In the wireless device or core network device, if transcoding needs to be implemented, corresponding audio encoding needs to be performed. The wireless device refers to a radio frequency-related device in communication, and the core network device refers to a core network-related device in communication.

In some embodiments of this application, the audio encoding apparatus may be applied to various terminal devices that need audio communication, and wireless devices and core network devices that need transcoding. For example, the audio encoding apparatus may be a multi-channel encoder of the terminal device, the wireless device, or the core network device. Similarly, the audio decoding apparatus may be applied to various terminal devices that need audio communication, and wireless devices and core network devices that need transcoding. For example, the audio decoding apparatus may be a multi-channel decoder of the terminal device, the wireless device or the core network device.

Figure 3:
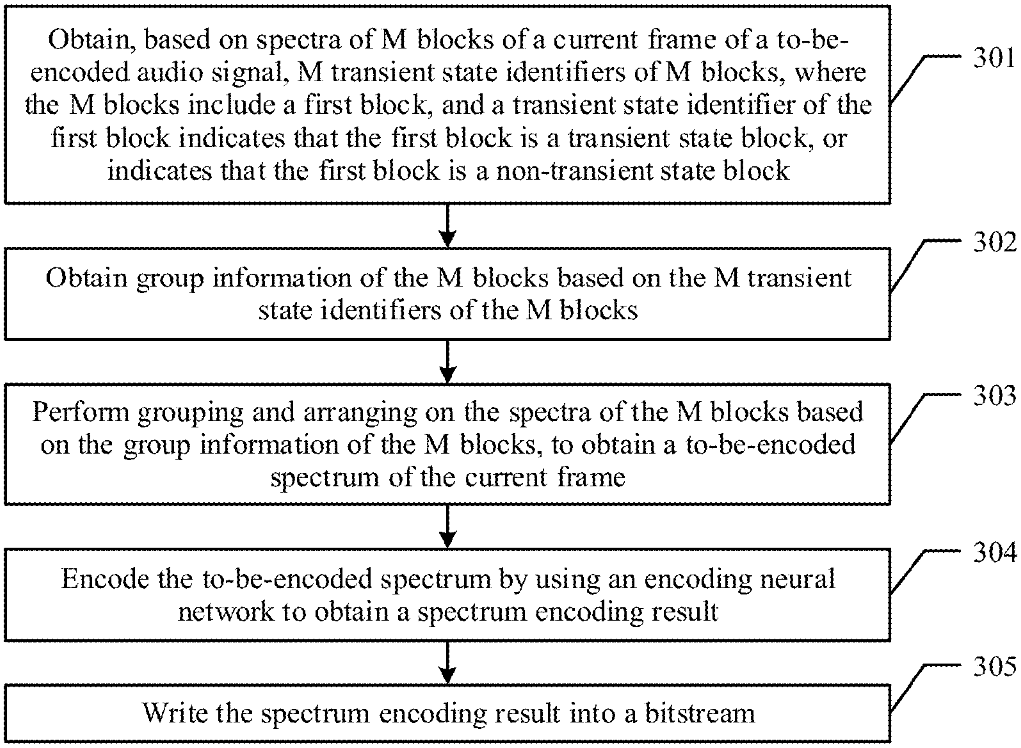
FIG. 3 is a schematic diagram of an audio signal encoding method according to an embodiment of this application.

An audio signal encoding method provided in embodiments of this application is first described. The method may be performed by a terminal device. For example, the terminal device may be an audio signal encoding apparatus (hereinafter referred to as an encoder side or an encoder, where for example, the encoder side may be an artificial intelligence (AI) encoder). As shown in FIG. 3, an encoding procedure performed at an encoder side in an embodiment of this application is described.

301: Obtain based on spectra of M blocks of a current frame of a to-be-encoded audio signal, M transient state identifiers of the M blocks, where the M blocks include a first block, and a transient state identifier of the first block indicates that the first block is a transient state block, or indicates that the first block is a non-transient state block.

The encoder side first obtains the to-be-encoded audio signal, and frames the to-be-encoded audio signal to obtain the current frame of the to-be-encoded audio signal. In subsequent embodiments, encoding of the current frame is used as an example for description, and encoding of another frame of the to-be-encoded audio signal is similar to the encoding of the current frame.

After determining the current frame, the encoder side performs windowing and time-frequency transformation on the current frame. If the current frame includes the M blocks, the spectra of the M blocks of the current frame may be obtained, where M represents a quantity of blocks included in the current frame. A value of M is not limited in this embodiment of this application. For example, the encoder side performs time-frequency transformation on the M blocks of the current frame, to obtain modified discrete cosine transform (MDCT) spectra of the M blocks. In subsequent embodiments, an example in which the spectra of the M blocks are MDCT spectra is used. The spectra of the M blocks may alternatively be other spectra. This is not limited.

After obtaining the spectra of the M blocks, the encoder side separately obtains the M transient state identifiers of the M blocks based on the spectra of the M blocks. A spectrum of each block is used to determine a transient state identifier of the block, each block corresponds to one transient state identifier, and a transient state identifier of one block indicates a spectrum change status of the block in the M blocks. For example, a block included in the M blocks is the first block, and the first block corresponds to one transient state identifier.

In some embodiments of this application, a value of the transient state identifier has a plurality of implementations. For example, the transient state identifier may indicate that the first block is a transient state block, or the transient state identifier may indicate that the first block is a non-transient state block. A transient state identifier of a block being a transient state indicates that a spectrum of the block changes greatly compared with a spectrum of another block in the M blocks. A transient state identifier of a block being a non-transient state indicates that a spectrum of the block does not change greatly compared with a spectrum of another block in the M blocks. For example, the transient state identifier occupies one bit. If the value of the transient state identifier is 0, the transient state identifier is the transient state; or if the value of the transient state identifier is 1, the transient state identifier is the non-transient state. Alternatively, if the value of the transient state identifier is 1, the transient state identifier is the transient state; or if the value of the transient state identifier is 0, the transient state identifier is the non-transient state. This is not limited herein.

302: Obtain group information of the M blocks based on the M transient state identifiers of the M blocks.

After the encoder side obtains the M transient state identifiers of the M blocks, the M transient state identifiers of the M blocks are used to group the M blocks, and the group information of the M blocks is obtained based on the M transient state identifiers of the M blocks. The group information of the M blocks may indicate a grouping manner of the M blocks, and the M transient state identifiers of the M blocks are a basis for grouping the M blocks. For example, blocks with a same transient state identifier may be grouped into one group. Blocks with different transient state identifiers are grouped into different groups.

In some embodiments of this application, the group information of the M blocks may have a plurality of implementations. The group information of the M blocks includes a group quantity or a group quantity identifier of the M blocks, and the group quantity identifier indicates the group quantity. When the group quantity is greater than 1, the group information of the M blocks further includes the M transient state identifiers of the M blocks. Alternatively, the group information of the M blocks includes the M transient state identifiers of the M blocks. The group information of the M blocks may indicate a grouping status of the M blocks, so that the encoder side may use the group information to perform grouping and arranging on the spectra of the M blocks.

For example, the group information of the M blocks includes the group quantity of the M blocks and the transient state identifiers of the M blocks. The transient state identifiers of the M blocks may also be referred to as group flag information. Therefore, the group information in this embodiment of this application may include the group quantity and the group flag information. For example, a value of the group quantity may be 1 or 2. The group flag information indicates the transient state identifiers of the M blocks.

For example, the group information of the M blocks includes the transient state identifiers of the M blocks. The transient state identifiers of the M blocks may also be referred to as group flag information. Therefore, the group information in this embodiment of this application may include the group flag information. For example, the group flag information indicates the transient state identifiers of the M blocks.

For example, the group information of the M blocks includes: The group quantity of the M blocks is 1, that is, when the group quantity is equal to 1, the group information of the M blocks does not include the M transient state identifiers, and when the group quantity is greater than 1, the group information of the M blocks further includes the M transient state identifiers of the M blocks.

For another example, the group quantity in the group information of the M blocks may be alternatively replaced with the group quantity identifier to indicate the group quantity. For example, when the group quantity identifier is 0, it indicates that the group quantity is 1, and when the group quantity identifier is 1, it indicates that the group quantity is 2.

In some embodiments of this application, the method performed at the encoder side further includes the following operations.

A1: Encode the group information of the M blocks to obtain a group information encoding result.

A2: Write the group information encoding result into a bitstream.

After obtaining the group information of the M blocks, the encoder side may carry the group information in the bitstream, and first encode the group information. An encoding manner used for the group information is not limited herein. The group information is encoded, so that the group information encoding result may be obtained. The group information encoding result may be written into the bitstream, so that the bitstream may carry the group information encoding result.

It should be noted that operation A2 and subsequent operation 305 are not subject to a sequence. Operation 305 may be performed before operation A2, operation A2 may be performed before operation 305, or operation A2 and operation 305 may be performed simultaneously. This is not limited herein.

303: Perform grouping arrangement on the spectra of the M blocks based on the group information of the M blocks, to obtain a to-be-encoded spectrum of the current frame.

The to-be-encoded spectrum may also be referred to as a grouping arranged spectrum of the M blocks.

After obtaining the group information of the M blocks, the encoder side may use the group information of the M blocks to perform grouping and arranging on the spectra of the M blocks in the current frame. Grouping and arranging is performed on the spectra of the M blocks, so that an arrangement sequence of the spectra of the M blocks in the current frame may be adjusted. The grouping and arranging is performed based on the group information of the M blocks, and the group information of the M blocks is obtained based on the M transient state identifiers of the M blocks. After grouping and arranging is performed on the M blocks, grouping arranged spectra of the M blocks are obtained. The grouping arranged spectra of the M blocks use the M transient state identifiers of the M blocks as a basis for grouping and arranging, and an encoding sequence of the spectra of the M blocks may be changed through grouping and arranging.

In some embodiments of this application, operation 303 in which grouping and arranging is performed on the spectra of the M blocks based on the group information of the M blocks, to obtain the to-be-encoded spectrum of the current frame includes the following operations.

B1: Allocate, to a transient state group, a spectrum of a block that is in the M blocks and that is indicated by the M transient state identifiers as a transient state block, and allocate, to a non-transient state group, a spectrum of a block that is in the M blocks and that is indicated by the M transient state identifiers as a non-transient state block.

B2: Arrange the spectrum of the block in the transient state group to be before the spectrum of the block in the non-transient state group, to obtain the to-be-encoded spectrum.

After obtaining the group information of the M blocks, the encoder side groups the M blocks based on different transient state identifiers, to obtain the transient state group and the non-transient state group; then arranges locations of the M blocks in the spectrum of the current frame; and arranges the spectrum of the block in the transient state group to be before the spectrum of the block in the non-transient group to obtain the to-be-encoded spectrum. In one embodiment, spectra of all transient state blocks in the to-be-encoded spectrum are located before the spectrum of the non-transient state block, so that the spectrum of the transient state block can be adjusted to a location with higher encoding importance, and a transient state characteristic of an audio signal reconstructed after encoding and decoding by using a neural network can be better retained.

In some embodiments of this application, operation 303 in which grouping and arranging is performed on the spectra of the M blocks based on the group information of the M blocks, to obtain the to-be-encoded spectrum of the current frame includes the following operation.

C1: Arrange a spectrum of a block that is in the M blocks and that is indicated by the M transient state identifiers as a transient state block to be before a spectrum of a block that is in the M blocks and that is indicated by the M transient state identifiers as a non-transient state block, to obtain the to-be-encoded spectrum of the current frame.

After obtaining the group information of the M blocks, the encoder side determines a transient state identifier of each of the M blocks based on the group information, and first finds P transient state blocks and Q non-transient state blocks from the M blocks. In this case, M=P+Q. The spectrum of the block that is in the M blocks and that is indicated by the M transient state identifiers as a transient state block is arranged to be before the spectrum of the block that is in the M blocks and that is indicated by the M transient state identifiers as a non-transient state block, to obtain the to-be-encoded spectrum of the current frame. In one embodiment, spectra of all transient state blocks in the to-be-encoded spectrum are located before the spectrum of the non-transient state block, so that the spectrum of the transient state block can be adjusted to a location with higher encoding importance, so that a transient state characteristic of an audio signal reconstructed after encoding and decoding by using a neural network can be better retained.

304: Encode the to-be-encoded spectrum by using an encoding neural network to obtain a spectrum encoding result.

305: Write the spectrum encoding result into the bitstream.

In this embodiment of this application, after obtaining the to-be-encoded spectrum of the current frame, the encoder side may perform encoding by using the encoding neural network, to generate the spectrum encoding result, and then write the spectrum encoding result into the bitstream. The encoder side may send the bitstream to a decoder side.

In an embodiment, the encoder side uses the to-be-encoded spectrum as input data of the encoding neural network, or may further perform other processing on the to-be-encoded spectrum, and then use the to-be-encoded spectrum as input data of the encoding neural network. After the encoding neural network performs processing, a latent variable may be generated, and the latent variable represents a feature of the grouping arranged spectra of the M blocks.

In some embodiments of this application, before operation 304 in which the to-be-encoded spectrum is encoded by using the encoding neural network, the method performed at the encoder side further includes the following operation.

D1: Perform intra-group interleaving on the to-be-encoded spectrum, to obtain intra-group interleaved spectra of the M blocks.

In this embodiment, operation 304 in which the to-be-encoded spectrum is encoded by using the encoding neural network includes the following operation.

E1: Encode, by using the encoding neural network, the intra-group interleaved spectra of the M blocks.

After obtaining the to-be-encoded spectrum of the current frame, the encoder side may first perform intra-group interleaving based on the grouping of the M blocks, to obtain the intra-group interleaved spectra of the M blocks. In this case, the intra-group interleaved spectra of the M blocks may be the input data of the encoding neural network. Through the intra-group interleaving, encoding side information can be further reduced, and encoding efficiency can be improved.

In some embodiments of this application, a quantity of blocks that are in the M blocks and that are indicated by the M transient state identifiers as transient state blocks is P, a quantity of blocks that are in the M blocks and that are indicated by the M transient state identifiers as non-transient state blocks is Q, and M=P+Q. Values of P and Q are not limited in this embodiment of this application.

In one embodiment, operation D1 in which intra-group interleaving is performed on the to-be-encoded spectrum includes the following operations.

D11: Interleave spectra of the P blocks to obtain interleaved spectra of the P blocks.

D12: Interleave spectra of the Q blocks to obtain interleaved spectra of the Q blocks.

Interleaving the spectra of the P blocks includes interleaving the spectra of the P blocks as a whole. Similarly, interleaving the spectra of the Q blocks includes interleaving the spectra of the Q blocks as a whole.

When operations D11 and D12 are performed, operation E1 in which the intra-group interleaved spectra of the M blocks are encoded by using the encoding neural network includes: encoding the interleaved spectra of the P blocks and the interleaved spectra of the Q blocks by using the encoding neural network.

In D11 and D12, the encoder side may perform interleaving based on the transient state group and the non-transient state group separately, to obtain the interleaved spectra of the P blocks and the interleaved spectra of the Q blocks. The interleaved spectra of the P blocks and the interleaved spectra of the Q blocks may be used as the input data of the encoding neural network. Through intra-group interleaving, encoding side information can be further reduced, and encoding efficiency can be improved.

In some embodiments of this application, before operation 301 in which the M transient state identifiers of the M blocks are obtained based on spectra of the M blocks of the current frame of the to-be-encoded audio signal, the method performed at the encoder side further includes the following operations.

F1: Obtain a window type of the current frame, where the window type is a short window type or a non-short window type.

F2: Only when the window type is the short window type, perform the operation of obtaining, based on the spectra of the M blocks of the current frame of the to-be-encoded audio signal, the M transient state identifiers of the M blocks.

Before the encoder side performs 301, the encoder side may first determine the window type of the current frame, where the window type may be the short window type or the non-short window type. For example, the encoder side determines the window type based on the current frame of the to-be-encoded audio signal. The short window may also be referred to as a short frame, and the non-short window may also be referred to as a non-short frame. When the window type is the short window type, operation 301 is triggered and performed. In this embodiment of this application, the foregoing encoding scheme may be executed only when the window type of the current frame is the short window type, to implement encoding when the audio signal is a transient state signal.

In some embodiments of this application, when the encoder side performs operations F1 and F2, the method performed at the encoder side further includes the following operations.

G1: Encode the window type to obtain an encoding result of the window type.

G2: Write the encoding result of the window type into the bitstream.

After obtaining the window type of the current frame, the encoder side may carry the window type in the bitstream, and first encode the window type. An encoding manner used for the window type is not limited herein. The window type is encoded, so that the encoding result of the window type may be obtained. The encoding result of the window type may be written into the bitstream, so that the bitstream may carry the encoding result of the window type.

In some embodiments of this application, operation 301 in which the M transient state identifiers of the M blocks are obtained based on the spectra of the M blocks of the current frame of the to-be-encoded audio signal includes the following operations.

H1: Obtain M pieces of spectrum energy of the M blocks based on the spectra of the M blocks.

H2: Obtain an average spectrum energy value of the M blocks based on the M pieces of spectrum energy.

H3: Obtain the M transient state identifiers of the M blocks based on the M pieces of spectrum energy and the average spectrum energy value.

After obtaining the M pieces of spectrum energy, the encoder side may average the M spectrum energy values to obtain the average spectrum energy value, or remove a maximum value or several maximum values from the M pieces of spectrum energy, and then average the remaining spectrum energy to obtain the average spectrum energy value. The spectrum energy of each block in the M pieces of spectrum energy is compared with the average spectrum energy value, to determine a change of a spectrum of each block compared with a spectrum of another block in the M blocks, to further obtain the M transient state identifiers of the M blocks. A transient state identifier of one block may be used to indicate a transient state feature of the block. In this embodiment of this application, the transient state identifier of each block may be determined based on the spectrum energy of each block and the average spectrum energy value, so that a transient state identifier of one block can determine group information of the block.

Further, in some embodiments of this application, when spectrum energy of the first block is greater than K times of the average spectrum energy value, the transient state identifier of the first block indicates that the first block is a transient state block; or when spectrum energy of the first block is less than or equal to K times of the average spectrum energy value, the transient state identifier of the first block indicates that the first block is a non-transient state block.

K is a real number greater than or equal to 1.

K has a plurality of values, which are not limited herein. A process of determining the transient state identifier of the first block in the M blocks is used as an example. When the spectrum energy of the first block is greater than K times of the average spectrum energy value, it indicates that the spectrum of the first block changes greatly compared with another block in the M blocks. In this case, the transient state identifier of the first block indicates that the first block is a transient state block. When the spectrum energy of the first block is less than or equal to K times of the average spectrum energy value, it indicates that the spectrum of the first block does not change greatly compared with another block in the M blocks, and the transient state identifier of the first block indicates that the first block is a non-transient state block.

Without a limitation, the encoder side may alternatively obtain the M transient state identifiers of the M blocks in other manners, for example, obtain a difference or a proportion value between the spectrum energy of the first block and the average spectrum energy value, and determine the M transient state identifiers of the M blocks based on the obtained difference or proportion value.

It can be learned from descriptions of the example of the encoder side in the foregoing embodiments that the M transient state identifiers of the M blocks are obtained based on the spectra of the M blocks of the current frame of the to-be-encoded audio signal. After the group information of the M blocks is obtained based on the M transient state identifiers, grouping and arranging may be performed on the spectra of the M blocks in the current frame by using the group information of the M blocks. Grouping and arranging is performed on the spectra of the M blocks, so that the arrangement sequence of the spectra of the M blocks in the current frame may be adjusted. After the to-be-encoded spectrum is obtained, the to-be-encoded spectrum is encoded by using the encoding neural network, to obtain the spectrum encoding result, and the spectrum encoding result may be carried in the bitstream. Therefore, in this embodiment of this application, grouping and arranging can be performed on the spectra of the M blocks based on the M transient state identifiers in the current frame of the audio signal. In this way, grouping and arranging and encoding can be performed on blocks with different transient state identifiers, and encoding quality of the audio signal can be improved.

Figure 4:
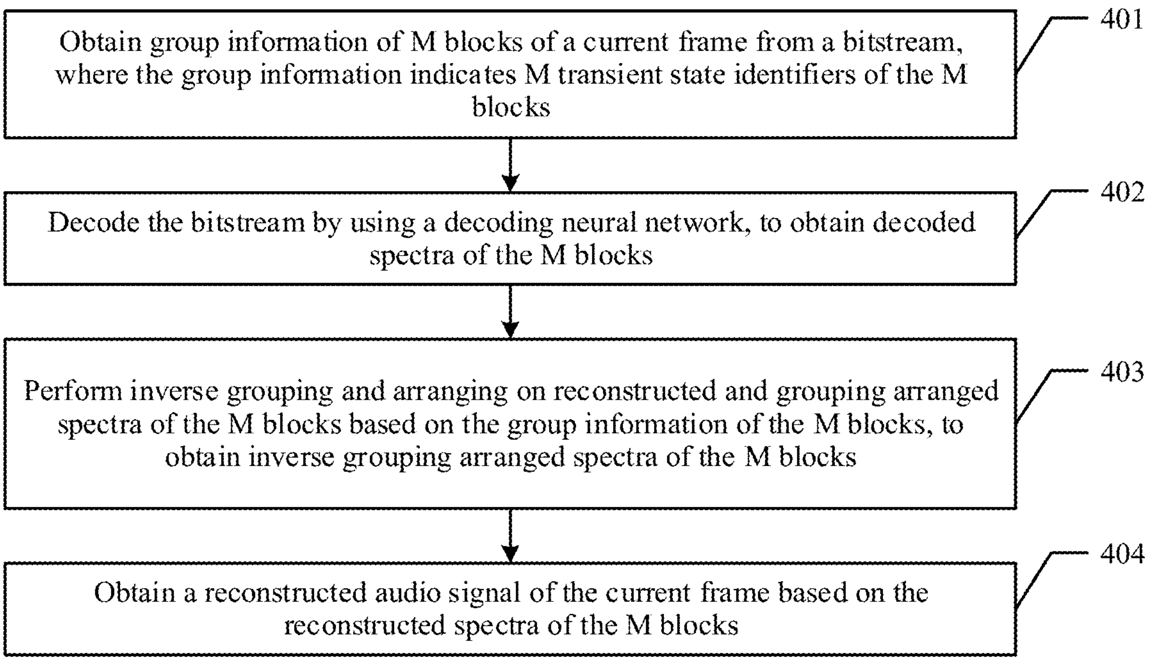
FIG. 4 is a schematic diagram of an audio signal decoding method according to an embodiment of this application.

An embodiment of this application further provides an audio signal decoding method. The method may be performed by a terminal device. For example, the terminal device may be an audio signal decoding apparatus (hereinafter referred to as a decoder side or a decoder, where for example, the decoder side may be an A1 decoder). As shown in FIG. 4, the method performed at the decoder side in this embodiment of this application mainly includes the following operations.

401: Obtain group information of M blocks of a current frame of an audio signal from a bitstream, where the group information indicates M transient state identifiers of the M blocks.

The decoder side receives the bitstream sent by an encoder side, the encoder side writes a group information encoding result into the bitstream, and the decoder side parses the bitstream to obtain the group information of the M blocks of the current frame of the audio signal. The decoder side may determine the M transient state identifiers of the M blocks based on the group information of the M blocks. For example, the group information may include a group quantity and group flag information. For another example, the group information may include the group flag information. For details, refer to the description of the foregoing embodiments of the encoder side.

402: Decode the bitstream by using a decoding neural network, to obtain decoded spectra of the M blocks.

After obtaining the bitstream, the decoder side decodes the bitstream by using the decoding neural network to obtain the decoded spectra of the M blocks. Because the encoder side performs grouping and arranging on spectra of the M blocks and encodes the spectra, the encoder side carries a spectrum encoding result in the bitstream. The decoded spectra of the M blocks correspond to grouping arranged spectra of the M blocks at the encoder side, and execution processes of the decoding neural network and an encoding neural network at the encoder side are opposite. Reconstructed and grouping arranged spectra of the M blocks may be obtained through decoding.

403: Perform inverse grouping and arranging on the decoded spectra of the M blocks based on the group information of the M blocks, to obtain inverse grouping arranged spectra of the M blocks.

The decoder side obtains the group information of the M blocks, and the decoder side further obtains the decoded spectra of the M blocks by using the bitstream. Because the encoder side performs grouping and arranging on the spectra of the M blocks, the process opposite to that at the encoder side needs to be executed at the decoder side. Therefore, inverse grouping and arranging is performed on the decoded spectra of the M blocks based on the group information of the M blocks, to obtain the inverse grouping arranged spectra of the M blocks, where the inverse grouping and arranging is opposite to the grouping and arranging at the encoder side.

404: Obtain a reconstructed audio signal of the current frame based on the inverse grouping arranged spectra of the M blocks.

After obtaining the inverse grouping arranged spectra of the M blocks, the encoder side may perform transformation from frequency domain to time domain on the inverse grouping arranged spectra of the M blocks, to obtain the reconstructed audio signal of the current frame.

In some embodiments of this application, before operation 403 in which inverse grouping and arranging is performed on the decoded spectra of the M blocks based on the group information of the M blocks, the method performed at the decoder side further includes the following operation.

I1: Perform intra-group de-interleaving on the decoded spectra of the M blocks, to obtain intra-group de-interleaved spectra of the M blocks.

Operation 403 in which inverse grouping and arranging is performed on the decoded spectra of the M blocks based on the group information of the M blocks includes the following operation.

J1: Perform inverse grouping and arranging on the intra-group de-interleaved spectra of the M blocks based on the group information of the M blocks.

Intra-group de-interleaving performed at the decoder side is an inverse process of intra-group interleaving performed at the encoder side. Details are not described herein again.

In some embodiments of this application, a quantity of blocks that are in the M blocks and that are indicated by the M transient state identifiers as transient state blocks is P, a quantity of blocks that are in the M blocks and that are indicated by the M transient state identifiers as non-transient state blocks is Q, and M=P+Q.

Operation I1 in which intra-group de-interleaving is performed on the decoded spectra of the M blocks includes the following operations.

I11: De-interleave decoded spectra of the P blocks.

I12: De-interleave decoded spectra of the Q blocks.

De-interleaving the spectra of the P blocks includes de-interleaving the spectra of the P blocks as a whole. Similarly, de-interleaving the spectra of the Q blocks includes de-interleaving the spectra of the Q blocks as a whole.

The encoder side may perform interleaving based on a transient state group and a non-transient state group separately, to obtain interleaved spectra of the P blocks and interleaved spectra of the Q blocks. The interleaved spectra of the P blocks and the interleaved spectra of the Q blocks may be used as input data of the encoding neural network. Through intra-group interleaving, encoding side information can be further reduced, and encoding efficiency can be improved. Because intra-group interleaving is performed at the encoder side, a corresponding inverse process needs to be performed at the decoder side, that is, de-interleaving may be performed at the decoder side.

In some embodiments of this application, a quantity of blocks that are in M reconstructed and grouping arranged blocks and that are indicated by the M transient state identifiers as transient blocks is P, a quantity of blocks that are in the M blocks and that are indicated by the M transient state identifiers as non-transient blocks is Q, and M=P+Q.

Operation 403 in which inverse grouping and arranging is performed on the decoded spectra of the M blocks based on the group information of the M blocks includes the following operations.

K1: Obtain indexes of the P blocks based on the group information of the M blocks.

K2: Obtain indexes of the Q blocks based on the group information of the M blocks.

K3: Perform inverse grouping and arranging on the decoded spectra of the M blocks based on the indexes of the P blocks and the indexes of the Q blocks.

Before the encoder side performs grouping and arranging on the spectra of the M blocks, indexes of the M blocks are consecutive, for example, from 0 to M−1. After the encoder side performs grouping and arranging, the indexes of the M blocks are no longer consecutive. The decoder side may obtain, based on the group information of the M blocks, the indexes of the P blocks in the reconstructed and grouping arranged M blocks and the indexes of the Q blocks in the reconstructed and grouping arranged M blocks. After the inverse grouping and arranging, indexes of the M blocks that can be recovered are still consecutive.

In some embodiments of this application, the method performed at the decoder side further includes the following operations.

L1: Obtain a window type of the current frame from the bitstream, where the window type is a short window type or a non-short window type.

L2: Only when the window type of the current frame is the short window type, perform the operation of obtaining the group information of the M blocks of the current frame from the bitstream.

In this embodiment of this application, the foregoing encoding scheme may be executed only when the window type of the current frame is the short window type, to implement encoding when the audio signal is a transient state signal. The decoder side performs a process opposite to that at the encoder side. Therefore, the decoder side may alternatively first determine the window type of the current frame, where the window type may be the short window type or the non-short window type. For example, the decoder side obtains the window type of the current frame from the bitstream. The short window may also be referred to as a short frame, and the non-short window may also be referred to as a non-short frame. When the window type is the short window type, operation 401 is triggered and performed.

In some embodiments of this application, the group information of the M blocks includes a group quantity or a group quantity identifier of the M blocks, the group quantity identifier indicates the group quantity. When the group quantity is greater than 1, the group information of the M blocks further includes the M transient state identifiers of the M blocks; or the group information of the M blocks includes the M transient state identifiers of the M blocks.

It can be learned by using the foregoing embodiment as an example for the decoder side that the group information of the M blocks of the current frame of the audio signal is obtained from the bitstream, and the group information indicates the M transient state identifiers of the M blocks. The bitstream is decoded by using the decoding neural network to obtain the decoded spectrum of M blocks. The inverse grouping and arranging processing are performed on the decoded spectra of the M blocks based on the group information of the M blocks, to obtain the spectra of the M blocks on which the inverse grouping and arranging processing are performed. A reconstructed audio signal of the current frame is obtained based on the spectra of the M blocks on which the inverse grouping and arranging processing are performed. Because the spectrum encoding result included in the bitstream is arranged and grouped, the decoded spectra of the M blocks may be obtained when the bitstream is decoded, and then the spectra of the M blocks on which the inverse grouping and arranging processing are performed may be obtained, to obtain the reconstructed audio signal of the current frame. During signal reconstruction, inverse grouping and arranging and decoding may be performed based on blocks with different transient state identifiers in the audio signal, so that an audio signal reconstruction effect can be improved.

To better understand and implement the foregoing solutions in the embodiment of this application, the following uses a corresponding application scenario as an example for a description.

Figure 5:
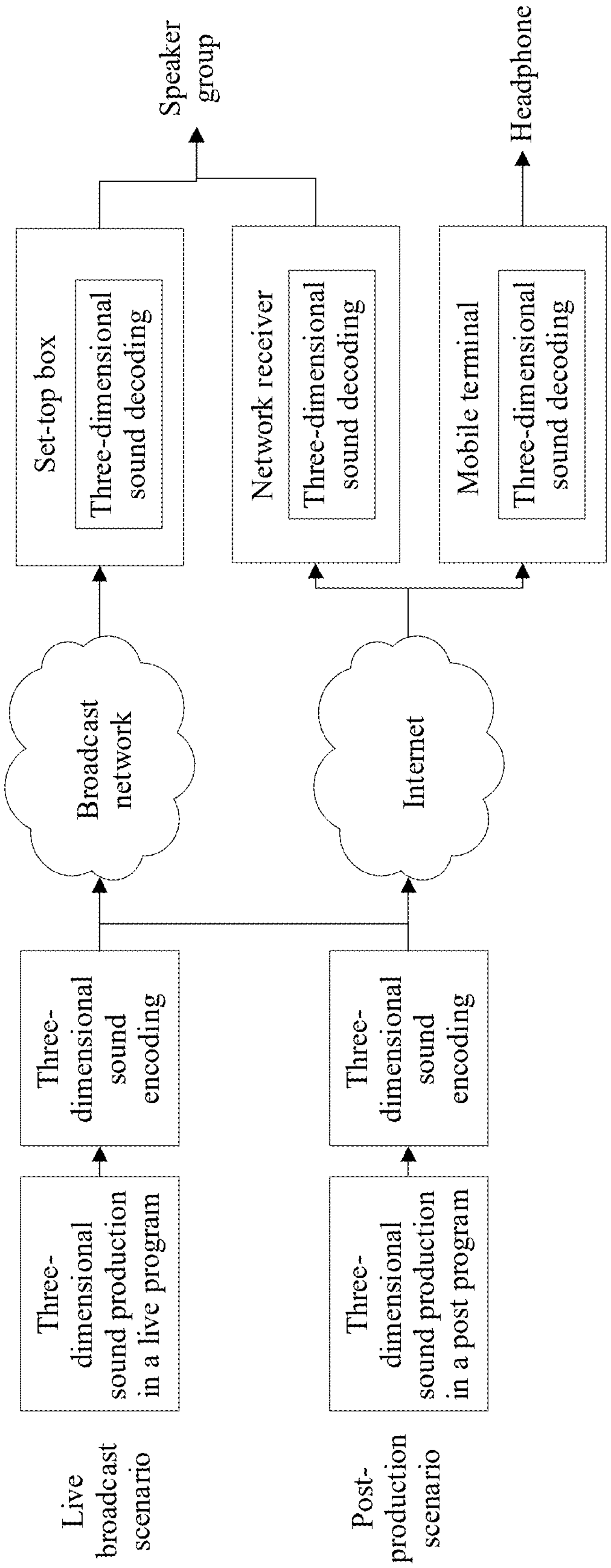
FIG. 5 is a schematic diagram of an audio signal encoding and decoding system according to an embodiment of this application.

FIG. 5 is a schematic diagram of a system architecture applied to the broadcast television field according to an embodiment of this application. This embodiment of this application may alternatively be applied to a live broadcast scenario and a post-production scenario of broadcast television, or may be applied to a three-dimensional sound codec in media playing of a terminal.

In the live broadcast scenario, a three-dimensional sound signal produced by three-dimensional sound of a live program obtains a bitstream by using three-dimensional sound encoding in this embodiment of this application, and is transmitted to a user side by using a broadcast network. A three-dimensional sound decoder in a set-top box decodes and reconstructs the three-dimensional sound signal, and a speaker group plays back the three-dimensional sound signal. In the post-production scenario, a three-dimensional sound signal produced by three-dimensional sound of a post program obtains a bitstream by using three-dimensional sound encoding in this embodiment of this application, and is transmitted to a user side by using a broadcast network or the Internet. A three-dimensional sound decoder in a network receiver or a mobile terminal decodes and reconstructs the three-dimensional sound signal, and a speaker group or headset plays back the three-dimensional sound signal.

This embodiment of this application provides an audio codec. The audio codec may include a radio access network, a media gateway, a transcoding device, a media resource server and the like in a core network, a mobile terminal, a fixed network terminal, and the like. It can also be applied to an audio codec in broadcast TV, terminal media playing, and VR streaming services.

The following separately describes application scenarios of an encoder side and a decoder side in embodiments of this application.

Figure 6:
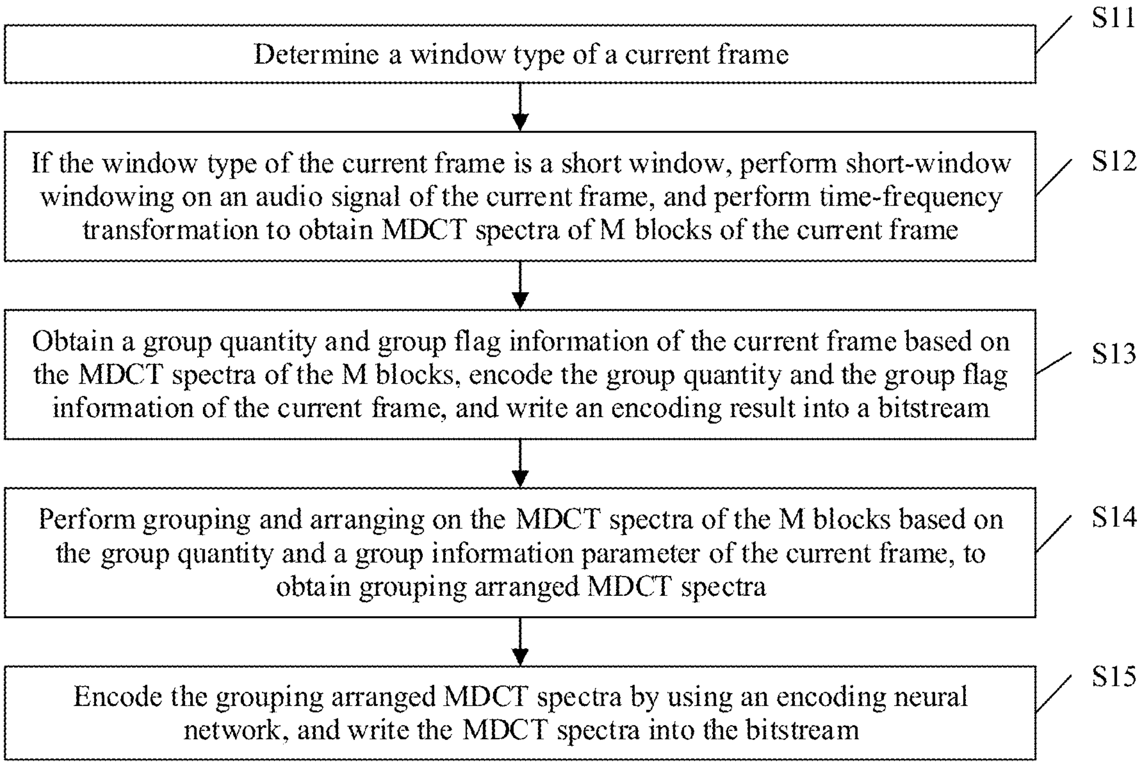
FIG. 6 is a schematic diagram of an audio signal encoding method according to an embodiment of this application.

As shown in FIG. 6, an encoder provided in an embodiment of this application is applied to perform the following audio signal encoding method, including the following operations.

S11: Determine a window type of a current frame.

An audio signal of the current frame is obtained, the window type of the current frame is determined based on the audio signal of the current frame, and the window type is written into a bitstream.

An embodiment includes the following three operations.

(1) Perform framing on a to-be-encoded audio signal to obtain the audio signal of the current frame.

For example, if a frame length of the current frame is L sampling points, the audio signal of the current frame is an L-point time domain signal.

(2) Perform transient state detection based on the audio signal of the current frame, and determine transient state information of the current frame.

There are a plurality of transient state detection methods, which are not limited in this embodiment of this application. The transient state information of the current frame may include: whether the current frame is an identifier of a transient state signal, a location at which a transient state of the current frame occurs, and one or more parameters representing a transient state degree. The transient state degree may be a transient state energy level, or a ratio of signal energy at a transient state occurrence location to signal energy at an adjacent non-transient state location.

(3) Determine the window type of the current frame based on the transient state information of the current frame, encode the window type of the current frame, and write an encoding result into the bitstream.

If the transient state information of the current frame represents that the current frame is the transient state signal, the window type of the current frame is a short window.

If the transient state information of the current frame represents that the current frame is a non-transient state signal, the window type of the current frame is a window type other than the short window. The another window type is not limited in this embodiment of this application. For example, the another window type may include a long window, a cut-in window, and a cut-out window.

S12: If the window type of the current frame is the short window, perform short-window windowing on the audio signal of the current frame, and perform time-frequency transformation to obtain MDCT spectra of M blocks of the current frame.

If the window type of the current frame is the short window, short-window windowing is performed on the audio signal of the current frame, and time-frequency transformation is performed, to obtain an MDCT spectrum of M blocks.

For example, if the window type of the current frame is the short window, windowing is performed by using M overlapped short window functions to obtain audio signals of M blocks after windowing, where M is a positive integer greater than or equal to 2. For example, a window length of the short window function is 2L/M, L is the frame length of the current frame, and an overlapped length is L/M. For example, M is equal to 8, L is equal to 1024, the window length of the short window function is 256 sampling points, and an overlapped length is 128 sampling points.

Time-frequency transformation is separately performed on the audio signals of the M blocks after windowing, to obtain the MDCT spectra of the M blocks of the current frame.

For example, a length of the audio signal of the current block after windowing is 256 sampling points, and after MDCT transformation, 128 MDCT coefficients are obtained, that is, the MDCT spectrum of the current block.

S13: Obtain a group quantity and group flag information of the current frame based on the MDCT spectrum of the M blocks, encode the group quantity and the group flag information of the current frame, and write the encoding result into the bitstream.

Before the group quantity and group flag information of the current frame are obtained in operation S13, in an embodiment, interleaving processing is first performed on the MDCT spectra of the M blocks to obtain interleaved MDCT spectrum of the M blocks. Next, an encoding preprocessing operation is performed on the interleaved MDCT spectra of the M blocks to obtain a preprocessed MDCT spectrum. Then, de-interleaving is performed on the preprocessed MDCT spectrum, to obtain MDCT spectra of the M blocks on which de-interleaving processing is performed. Finally, the group quantity and the group flag information of the current frame are determined based on the MDCT spectra of the M blocks on which de-interleaving processing is performed.

That interleaving is performed on the MDCT spectra of the M blocks is interleaving the M MDCT spectra whose lengths are L/M into MDCT spectra whose lengths are L. M spectrum coefficients whose frequency bin locations are i in MDCT spectra of the M blocks are arranged together in sequence from 0 to M−1 according to sequence numbers of blocks in which the M blocks are located. Then, M spectrum coefficients whose frequency bin locations are i+1 in the MDCT spectra of the M blocks are arranged together in sequence from 0 to M−1 according to sequence numbers of blocks where the M blocks are located, and a value of i is from 0 to L/M−1.

The encoding preprocessing operation may include processing such as frequency domain noise shaping (FDNS), temporal noise shaping (TNS), and bandwidth extension (BWE), which is not limited herein.

The de-interleaving processing is an inverse process of the interleaving processing. A length of a preprocessed MDCT spectrum is L, and the preprocessed MDCT spectrum with the length of L is divided into M MDCT spectra with the length of L/M, and MDCT spectra in each block are arranged in ascending order of frequency bins. MDCT spectra of the M blocks on which the de-interleaving processing is performed can be obtained. Preprocessing on the interleaved spectrum can reduce encoding side information, reduce bit occupation of the side information and improve encoding efficiency.

The group quantity and the group flag information of the current frame are determined based on the MDCT spectra of the M blocks on which the de-interleaving processing is performed. The method includes the following three operations.

(a) Calculate MDCT spectrum energy of the M blocks.

It is assumed that the MDCT spectrum coefficients of the M blocks after the de-interleaving processing are mdctSpectrum[8][128], MDCT spectrum energy of each block is calculated and denoted as enerMdct[8]. 8 is a value of M, and 128 indicates a quantity of MDCT coefficients in a block.

(b) Calculate an average value of the MDCT spectrum energy based on the MDCT spectrum energy of the M blocks. The following two methods are included.

Method 1: Directly calculate the average value of the MDCT spectrum energy of the M blocks, that is, an average value of enerMdct[8], and use the average value as the average value avgEner of the MDCT spectrum energy.

Method 2: Determine a block with maximum MDCT spectrum energy in the M blocks, and calculate an average value of MDCT spectrum energy of M−1 blocks except one block with largest energy is calculated as the average value avgEner of the MDCT spectrum energy. Alternatively, an average value of MDCT spectrum energy of other blocks except several blocks with maximum energy is calculated, and is used as the average value avgEner of the MDCT spectrum energy.

(c) Determine the group quantity and the group flag information of the current frame based on the average value of the MDCT spectrum energy of the M blocks and the MDCT spectrum energy, and write the group quantity and the group flag information of the current frame into the bitstream.

In one embodiment, the MDCT spectrum energy of each block is compared with the average value of the MDCT spectrum energy. If the MDCT spectrum energy of the current block is greater than K times of the average value of the MDCT spectrum energy, the current block is a transient state block, and a transient state identifier of the current block is 0. Otherwise, the current block is a non-transient state block, and a non-transient state identifier of the current block is 1. K is greater than or equal to 1, for example, K=2. The M blocks are grouped based on the transient state identifiers of the blocks, and the group quantity and group flag information are determined. Those with a same transient state identifier value form a group, the M blocks are divided into N group, and N is the group quantity. The group flag information is information formed by a transient state identifier value of each of the M blocks.

For example, the transient state block forms a transient state group, and a non-transient state block forms a non-transient state group. In one embodiment, if the transient state identifiers of the blocks are not completely the same, the group quantity numGroups of the current frame is 2, and otherwise, the group quantity is 1. The group quantity may be represented by the group quantity identifier. For example, if the group quantity identifier is 1, it indicates that the group quantity of the current frame is 2. If the group quantity identifier is 0, it indicates that the group quantity of the current frame is 1. The group flag information groupIndicator of the current frame is determined based on the transient state identifiers of the M blocks. For example, the transient state identifiers of the M blocks are sequentially arranged to form the group flag information groupIndicator of the current frame.

Before the obtaining the group quantity and group flag information in operation S13, another embodiment is: not performing interleaving processing and de-interleaving processing on the MDCT spectra of the M blocks, but directly determining the group quantity and group flag information of the current frame based on the MDCT spectra of the M blocks; encoding the group quantity and the group flag information of the current frame, and writing an encoding result into the bitstream.

That determining the group quantity and group flag information of the current frame based on the MDCT spectra of the M blocks is similar to determining the group quantity and group flag information of the current frame based on the MDCT spectra of the M blocks after de-interleaving. Details are not described herein again.

The group quantity and the group flag information of the current frame are written into the bitstream.

In addition, the non-transient state group may be further divided into two or more other groups. This is not limited in this embodiment of this application. For example, the non-transient state group may be divided into a harmonic group and a non-harmonic group.

S14: Perform grouping and arranging on the MDCT spectra of the M blocks based on the group quantity and the group flag information of the current frame, to obtain grouping arranged MDCT spectra. The grouping arranged MDCT spectra are to-be-encoded spectra of the current frame.

If the group quantity of the current frame is 2, audio signal spectra of the M blocks of the current frame need to be grouped and arranged. An arrangement manner is as follows: in the M blocks, several blocks belonging to the transient state group are adjusted to the front, and several blocks belonging to the non-transient state group are adjusted to the back. An encoding neural network of an encoder has a better encoding effect for a spectrum arranged in the front. Therefore, adjusting the transient state block to the front can ensure the encoding effect of the transient state block. This retains spectrum details of more transient state blocks, and improves encoding quality.

The MDCT spectra of the M blocks of the current frame are grouped and arranged based on the group quantity and the group flag information of the current frame, or the MDCT spectra of the M blocks of the current frame after de-interleaving may be grouped and arranged based on the group quantity and the group flag information of the current frame.

S15: Encode the grouping arranged MDCT spectra by using an encoding neural network, and write the MDCT spectra into the bitstream.

Intra-group interleaving processing is first performed on the MDCT spectrum after grouping and arranging, to obtain intra-group interleaved MDCT spectrum. Then, the encoding neural network is used to encode the intra-group interleaved MDCT spectrum. The intra-group interleaving processing is similar to the interleaving processing performed on the MDCT spectra of the M blocks before the group quantity and the group flag information are obtained, except that an interleaved object is MDCT spectra belonging to a same group. For example, interleaving processing is performed on an MDCT spectrum block belonging to the transient state group. Interleaving processing is performed on an MDCT spectrum block belonging to the non-transient state group.

Encoding neural network processing is pre-trained. A network structure and training method of the encoding neural network are not limited in this embodiment of this application. For example, the encoding neural network may select a fully connected network or a convolutional neural network (CNN).

Figure 7:
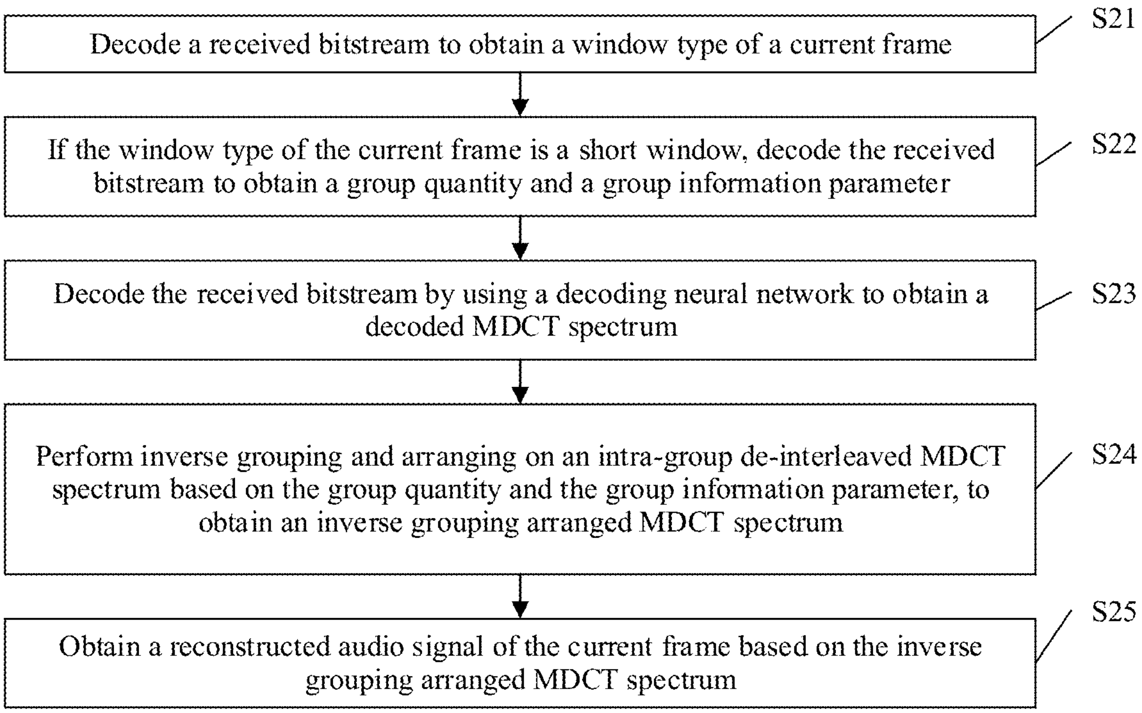
FIG. 7 is a schematic diagram of an audio signal decoding method according to an embodiment of this application.

As shown in FIG. 7, a decoding process corresponding to an encoder side includes the following operations.

S21: Decode a received bitstream to obtain a window type of a current frame.

S22: If the window type of the current frame is a short window, decode the received bitstream to obtain a group quantity and group flag information.

The group quantity identification information in the bitstream may be parsed, and the group quantity of the current frame may be determined based on the group quantity identification information. For example, if a group quantity identifier is 1, it indicates that the group quantity of the current frame is 2. If a group quantity identifier is 0, it indicates that the group quantity of the current frame is 1.

If the group quantity of the current frame is greater than 1, the received bitstream may be decoded to obtain the group flag information.

That decoding the received bitstream to obtain the group flag information may be: reading M bits of group flag information from the bitstream. Whether the $i^{th}$ block is the transient state block may be determined based on a value of the $i^{th}$ bit in the group flag information. If the value of the $i^{th}$ bit is 0, it indicates that the $i^{th}$ block is the transient state block; and if the value of the $i^{th}$ bit is 1, it indicates that the $i^{th}$ block is the non-transient state block.

S23: Decode the received bitstream by using a decoding neural network to obtain a decoded MDCT spectrum.

A decoding process at a decoder side corresponds to an encoding process at the encoder side. The operations are as follows.

First, the received bitstream is decoded, and the decoding neural network is used to obtain the decoded MDCT spectrum.

Then, based on the group quantity and the group flag information, decoded MDCT spectra belonging to a same group may be determined. Intra-group de-interleaving processing is performed on the MDCT spectra belonging to the same group, to obtain the MDCT spectra on which intra-group de-interleaving processing is performed. The intra-group de-interleaving processing process is the same as the de-interleaving processing performed on MDCT spectra of the M blocks through interleaving processing before the encoder side obtains the group quantity and the group flag information.

S24: Perform inverse grouping and arranging on the intra-group de-interleaved MDCT spectrum based on the group quantity and the group flag information, to obtain an inverse grouping arranged MDCT spectrum.

If the group quantity of the current frame is greater than 1, inverse group arrangement processing needs to be performed on the MDCT spectrum through the intra-group de-interleaving processing based on the group flag information. The inverse group arrangement processing at the decoder side is an inverse process of the group arrangement processing at the encoder side.

For example, it is assumed that the MDCT spectrum through intra-group de-interleaving processing is formed by M MDCT spectrum blocks with L/M point. A block index idx0(i) of the $i^{th}$ transient state block is determined based on the group flag information; and an MDCT spectrum of the $i^{th}$ block in the MDCT spectrum through intra-group de-interleaving processing as an MDCT spectrum of the idx0 $(i)^{th}$ block in the MDCT spectrum through inverse grouping and arranging processing. The block index idx0(i) of the $i^{th}$ transient state block is a block index corresponding to a block whose $i^{th}$ flag value is 0 in the group flag information, and i starts from 0. A quantity of transient state blocks is a quantity of bits whose flag value is 0 in the group flag information, and is denoted as num0. After processing the transient state block, the non-transient state block needs to be processed. A block index idx1 (j) of the $j^{th}$ non-transient state block is determined based on the group flag information; and an MDCT spectrum of the $(num0+j)^{th}$ block in the MDCT spectrum through intra-group de-interleaving processing as an MDCT spectrum of the $idx1(j)^{th}$ block in the MDCT spectrum through inverse grouping and arranging processing. The block index idx1(j) of the $j^{th}$ non-transient state block is a block index corresponding to a block whose $j^{th}$ flag value is 1 in the group flag information, and j starts from 0.

S25: Obtain a reconstructed audio signal of the current frame based on the inverse grouping arranged MDCT spectrum.

The reconstructed audio signal is obtained based on the MDCT spectrum through inverse grouping and arranging processing, where an embodiment is as follows: first, performing interleaving on MDCT spectra of M blocks through inverse grouping and arranging processing, to obtain an interleaved MDCT spectrum of the M block; next, a post processing at a decoder side is performed on the interleaved MDCT spectra of the M blocks. For example, the post processing at the decoder side may include inverse TNS, inverse FDNS, BWE processing, and the like. The post processing at the decoder side is in a one-to-one correspondence with an encoding pre-processing manner at the encoder side, to obtain an MDCT spectrum after the post processing at the decoder side. Then, de-interleaving processing is performed on the MDCT spectrum after the post processing at the decoder side, to obtain MDCT spectra of the M blocks through de-interleaving processing. Finally, frequency domain to time domain transformation is performed on the MDCT spectra of the M blocks through the de-interleaving, and de-windowing and superimposed addition processing are performed to obtain the reconstructed audio signal.

Another embodiment of obtaining the reconstructed audio signal based on the MDCT spectrum through the inverse grouping and arranging processing is: performing frequency domain to time domain transformation on the MDCT spectra of the M blocks respectively, and performing de-windowing and superimposed addition processing to obtain the reconstructed audio signal.

Figure 8A:
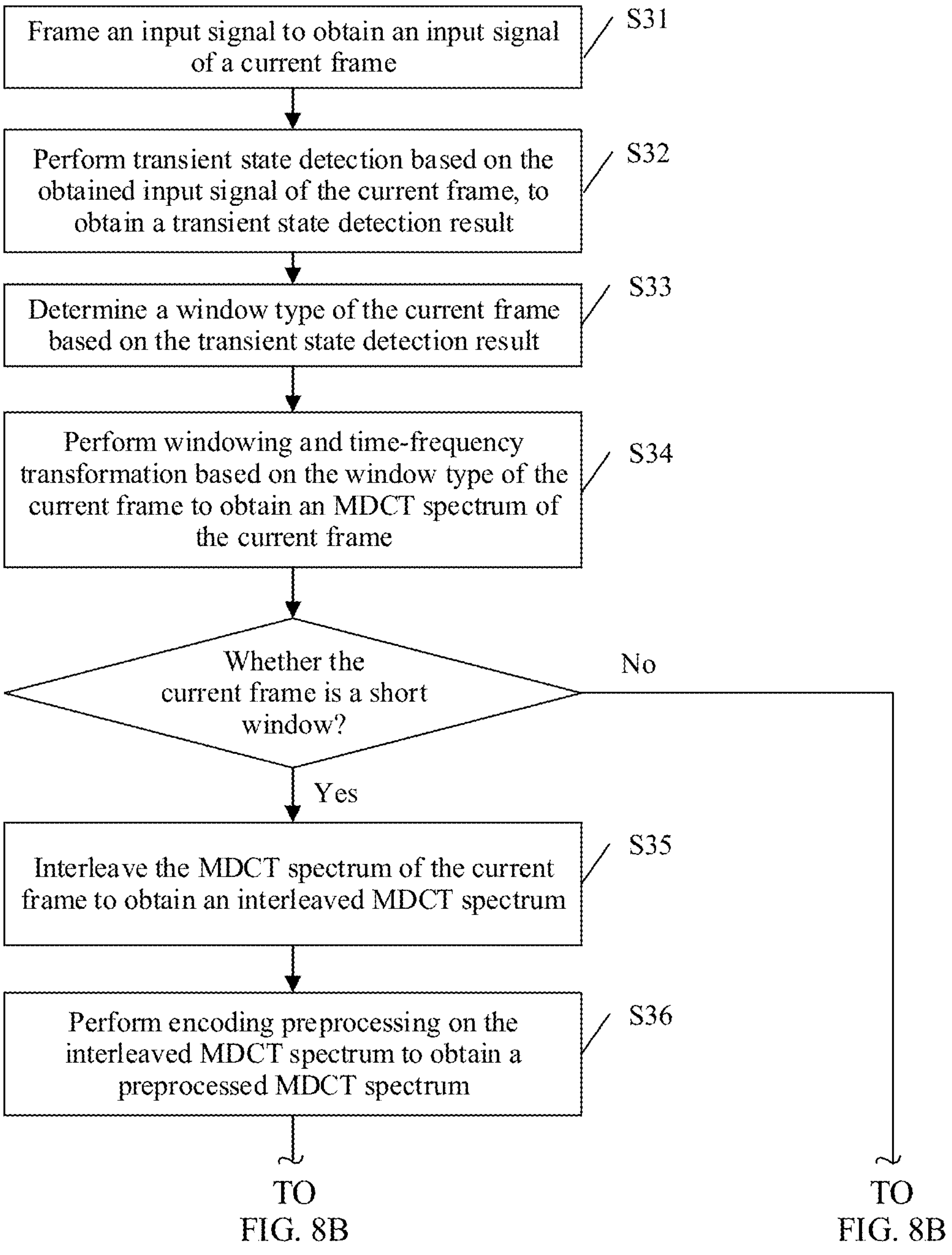
FIG. 8A and FIG. 8B are a schematic diagram of an audio signal encoding method according to an embodiment of this application.
Figure 8B:
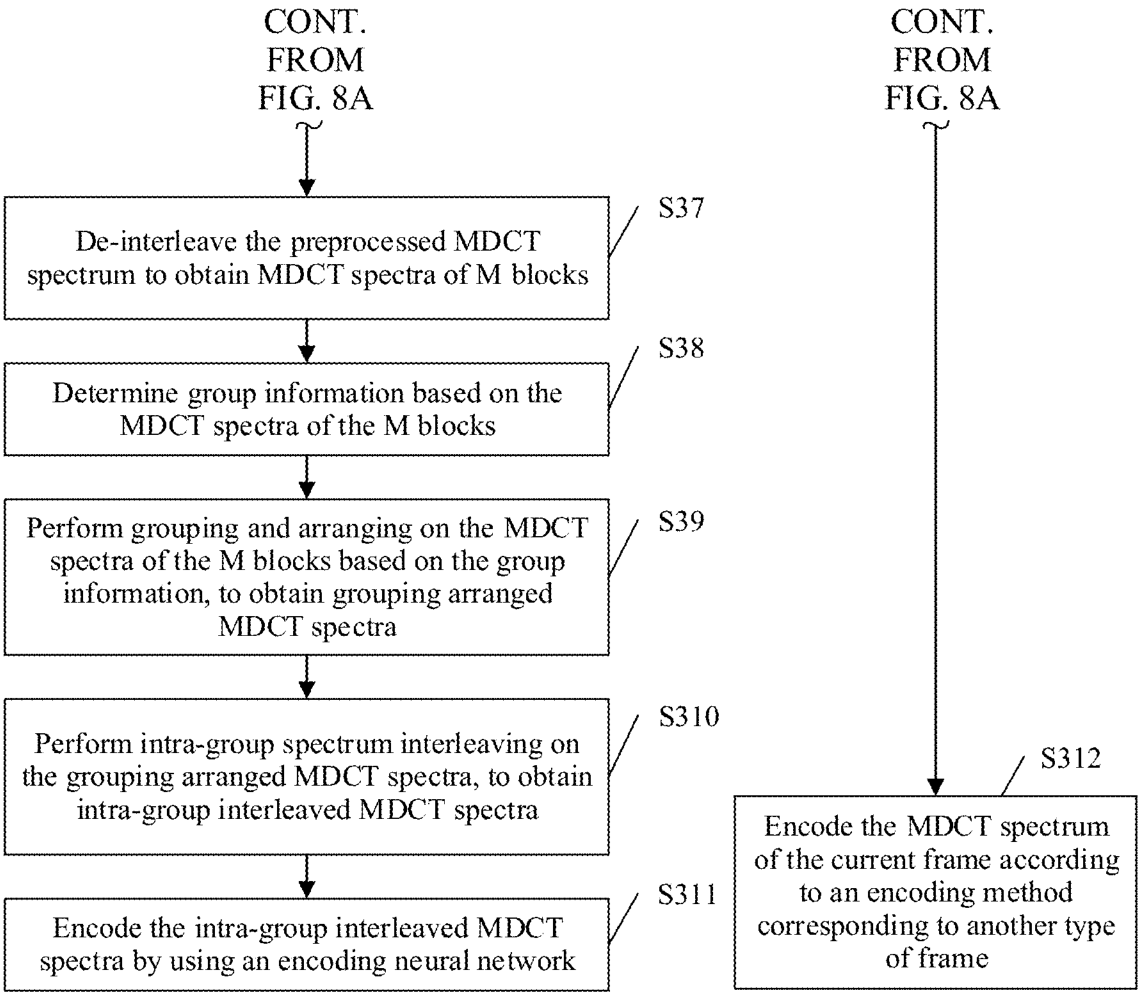

As shown in FIG. 8A and FIG. 8B, an audio signal encoding method performed at an encoder side includes the following operations.

S31: Frame an input signal to obtain an input signal of a current frame.

For example, if a frame length is 1024, the input signal of the current frame is a 1024-point audio signal.

S32: Perform transient state detection based on the obtained input signal of the current frame, to obtain a transient state detection result.

For example, the input signal of the current frame is divided into L blocks, and signal energy in each block is calculated. If signal energy in a neighboring block suddenly changes, the current frame is considered as a transient state signal. For example, L is a positive integer greater than 2, and may be L=8. If a difference between signal energy in neighboring blocks is greater than a preset threshold, the current frame is considered as a non-transient state signal.

S33: Determine a window type of the current frame based on the transient state detection result.

If the transient state detection result of the current frame is the transient state signal, the window type of the current frame is a short window; otherwise, the window type of the current frame is a long window.

In addition to the short window and the long window, a cut-in window and a cut-out window may alternatively be added in the window type of the current frame. It is assumed that a frame sequence number of the current frame is i, and the window type of the current frame is determined based on transient state detection results of an i−1 frame and an i−2 frame and the transient state detection result of the current frame.

If transient state detection results of the $i^{th}$ frame, the $(i-1)^{th}$ frame, and the $(i-_2)^{th}$ frame are all non-transient state signals, the window type of the $i^{th}$ frame is the long window.

If a transient state detection result of the $i^{th}$ frame is the transient state signal, and the transient state detection results of the $(i-1)^{th}$ frame and the $(i-2)^{th}$ frame are non-transient state signals, the window type of the $i^{th}$ frame is the cut-in window.

If the transient state detection results of the $i^{th}$ frame and the $(i-1)^{th}$ frame are the non-transient state signals, and a transient state detection result of the $(i-_2)^{th}$ frame is the transient state signal, the window type of the $i^{th}$ frame is the cut-out window.

If transient state detection results of the $i^{th}$ frame, the (i−1)th frame, and the $(i-_2)$th frame are other cases other than the foregoing three cases, the window type of the $i^{th}$ frame is the short window.

S34: Perform windowing and time-frequency transformation based on the window type of the current frame to obtain an MDCT spectrum of the current frame.

Based on the long window, cut-in window, cut-out window, and short window types, windowing and MDCT transformation are separately performed. For the long window, the cut-in window, and the cut-out window, if a signal length after windowing is 2048, 1024 MDCT coefficients are obtained. For the short window, eight overlapped short windows with a length of 256 are added, and 128 MDCT coefficients are obtained for each short window. The 128-point MDCT coefficients of each short window are called a block, and there are 1024 MDCT coefficients in total.

Whether the window type of the current frame is the short window is determined. If the window type of the current frame is the short window, the following operation S35 is performed; or if the window type of the current frame is not the short window, the following operation S312 is performed.

S35: If the window type of the current frame is the short window, interleave the MDCT spectrum of the current frame to obtain an interleaved MDCT spectrum.

If the window type of the current frame is the short window, interleaving processing is performed on MDCT spectra of eight blocks, that is, eight 128-dimensional MDCT spectra are interleaved into an MDCT spectrum with a length of 1024.

An interleaved spectrum form may be: block 0 bin 0, block 1 bin 0, block 2 bin 0, . . . block 7 bin 0, block 0 bin 1, block 1 bin 1, block 2 bin 1, . . . , block 7 bin 1, . . . .

block 0 bin 0 indicates the 0th frequency of the 0th block.

S36: Perform encoding preprocessing on the interleaved MDCT spectrum to obtain a preprocessed MDCT spectrum.

The preprocessing may include processing such as FDNS, TNS, and BWE.

S37: De-interleave the preprocessed MDCT spectrum to obtain MDCT spectra of M blocks.

De-interleaving is performed in an opposite manner to operation S35 to obtain MDCT spectra of 8 blocks, where each block is 128 points.

S38: Determine group information based on the MDCT spectra of the M blocks.

The information may include a group quantity numGroups and group flag information groupIndicator. A solution for determining the group information based on the MDCT spectra of the M blocks may be any one of operation S13 performed at the encoder side. For example, if MDCT spectrum coefficients of eight blocks in a short frame are mdctSpectrum[8][128], MDCT spectrum energy of each block is calculated and denoted as enerMdct[8]. An average value of the MDCT spectrum energy of eight blocks is calculated and is denoted as avgEner. Herein, there are two methods for calculating the average value of the MDCT spectrum energy.

Method 1: Directly calculate the average value of the MDCT spectrum energy of eight blocks, that is, an average value of enerMdct[8].

Method 2: To reduce the impact of a block with the largest energy in the eight blocks on calculation of the average value, maximum block energy may be removed, and then the average value is calculated.

The MDCT spectrum energy of each block is compared with the average energy. If the MDCT spectrum energy is greater than several times of the average energy, the current block is considered as the transient state block (denoted as 0); otherwise, the current block is considered as the non-transient state block (denoted as 1). All the transient state blocks form a transient state group. All non-transient state blocks form a non-transient state group.

For example, if the window type of the current frame is the short window, the group information obtained by preliminarily determining may be:

the group quantity numGroups: 2.

Block index: 0 1 2 3 4 5 6 7.

The group flag information groupIndicator: 1 1 1 0 0 0 0 1.

The group quantity and the group flag information need to be written into the bitstream and transmitted to the decoder side.

S39: Perform grouping and arranging on the MDCT spectra of the M blocks based on the group information, to obtain grouping arranged MDCT spectra.

A solution for grouping and arranging the MDCT spectra of the M blocks based on the group information may be any one of operation S14 performed at the encoder side.

For example, in the eight blocks of the short frame, several blocks belonging to the transient state group are placed in the front, and several blocks belonging to other groups are placed in the back.

For example, the example in operation S38 is still used. If the group information is:

Block index: 0 1 2 3 4 5 6 7, and the group flag information groupIndicator: 1 1 1 0 0 0 0 1, a spectrum form after spectrum arrangement is as follows:

Block index: 3 4 5 6 0 1 2 7.

In one embodiment, a spectrum of the 0th block after arrangement is a spectrum of 3rd block before arrangement, a spectrum of the 1st block after arrangement is a spectrum of the 4th block before arrangement, and a spectrum of the 2nd block after arrangement is a spectrum of the 5th block before arrangement. A spectrum of the 3rd block after arrangement is a spectrum of the 6th block before arrangement, a spectrum of the 4th block after arrangement is a spectrum of the 0th block before arrangement, and a spectrum of the 5th block after arrangement is a spectrum of the 1st block before arrangement. A spectrum of the 6th block after arrangement is a spectrum of the 2nd block before arrangement, and a spectrum of the 7th block after arrangement is a spectrum of the 7th block before arrangement.

S310: Perform intra-group spectrum interleaving on the grouping arranged MDCT spectra, to obtain intra-group interleaved MDCT spectra.

Intra-group interleaving processing is performed on each group by the MDCT spectrum after grouping and arranging. The processing manner is similar to operation S35, except that the interleaving processing is limited to processing MDCT spectra belonging to the same group.

Still using the foregoing example as an example, in arranged spectra, interleaving is performed on the transient state group (the blocks 3rd, 4th, 5th, and 6th before arrangement, namely, the blocks 0th, 1st, 2nd, and 3rd after arrangement). Interleaving is performed on other groups (the blocks 0th, 1st, 2nd, and 7th before arrangement, namely, the blocks 4th, 5th, 6th, and 7th after arrangement).

S311: Encode the intra-group interleaved MDCT spectrum by using an encoding neural network.

A method for encoding the intra-group interleaved MDCT spectrum by using an encoding neural network is not limited in this embodiment of this application. For example, the intra-group interleaved MDCT spectrum is processed by using the encoding neural network to generate a latent variable. The latent variable is quantized to obtain a quantized latent variable. Arithmetic encoding is performed on the quantized latent variable, and an arithmetic encoding result is written into the bitstream.

S312: If the current frame is not the short frame, encode the MDCT spectrum of the current frame according to an encoding method corresponding to another type of frame.

For encoding of the another type of frame, grouping, arrangement, and intra-group interleaving processing may not be performed. For example, the MDCT spectrum of the current frame obtained in operation S34 is directly encoded by using the encoding neural network.

For example, a window function corresponding to the window type is determined, and windowing processing is performed on an audio signal of the current frame, to obtain a signal obtained after the windowing processing. When windows of adjacent frames are overlapped, time-frequency positive transformation is performed on the signal after windowing processing, for example, MDCT transformation, to obtain the MDCT spectrum of the current frame; and the MDCT spectrum of the current frame is encoded.

Figure 9A:
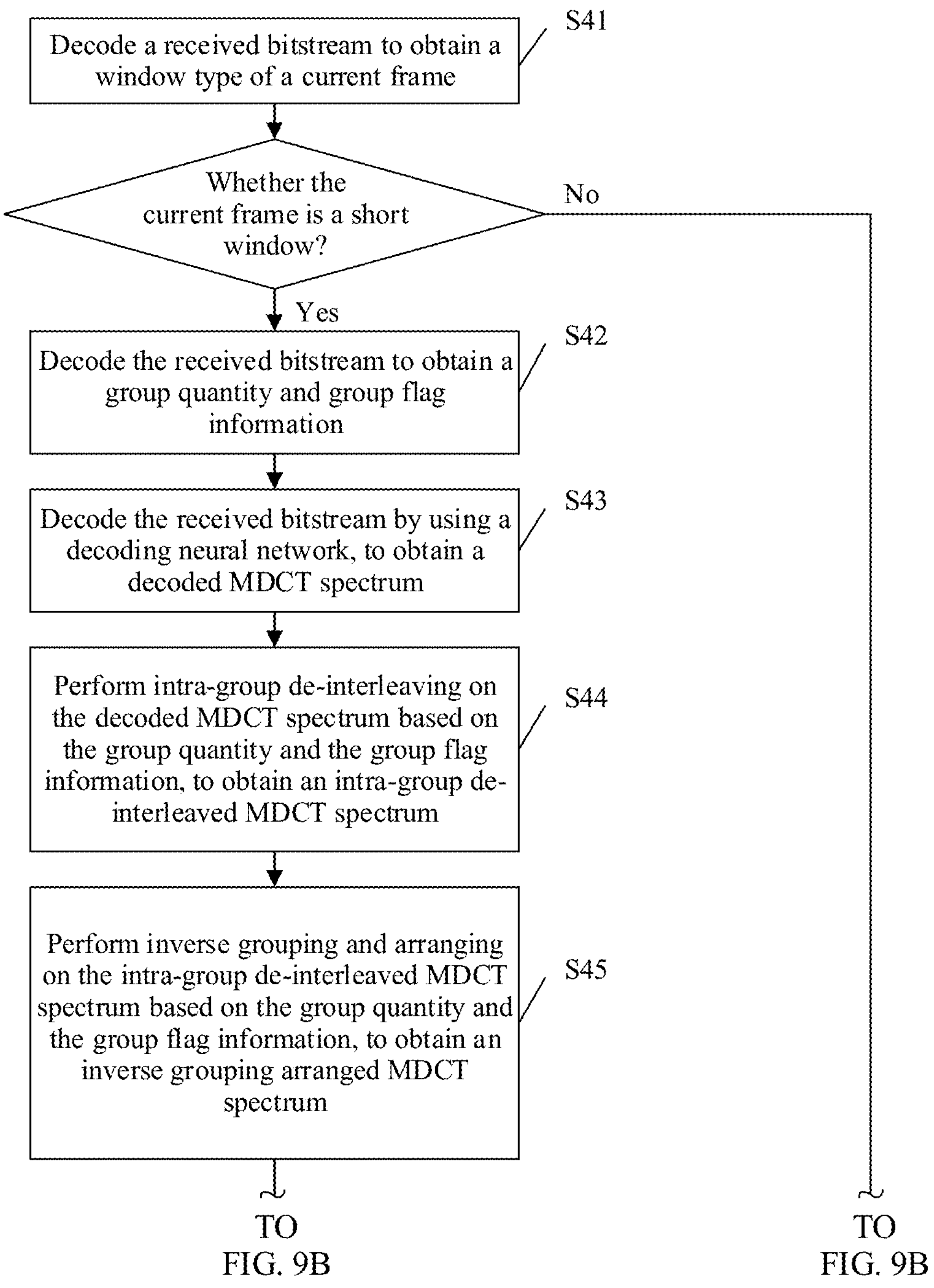
FIG. 9A and FIG. 9B are a schematic diagram of an audio signal decoding method according to an embodiment of this application.
Figure 9B:
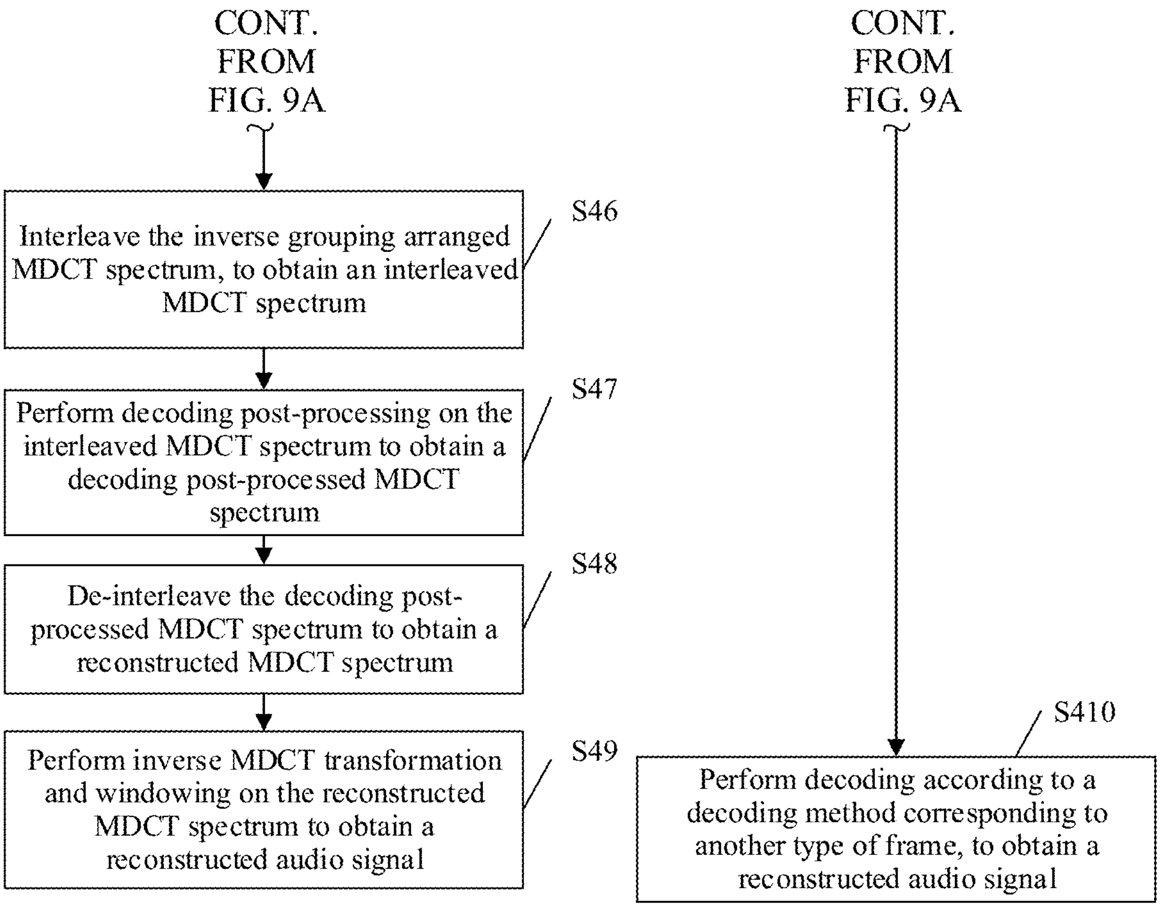

As shown in FIG. 9A and FIG. 9B, an audio signal decoding method performed at a decoder side includes the following operations.

S41: Decode a received bitstream to obtain a window type of a current frame.

Whether the window type of the current frame is a short window is determined. If the window type of the current frame is the short window, the following operation S42 is performed; or if the window type of the current frame is not the short window, the following operation S410 is performed.

S42: If the window type of the current frame is the short window, decode the received bitstream to obtain a group quantity and group flag information.

S43: Decode the received bitstream by using a decoding neural network, to obtain a decoded MDCT spectrum.

The decoding neural network corresponds to an encoding neural network. For example, a method for decoding by using the decoding neural network is as follows: arithmetic decoding is performed based on the received bitstream, to obtain a quantized latent variable. Dequantization processing is performed on the quantized latent variable to obtain a dequantized latent variable. The dequantized latent variable is used as an input, and processed by the decoding neural network to generate the decoded MDCT spectrum.

S44: Perform intra-group de-interleaving on the decoded MDCT spectrum based on the group quantity and the group flag information, to obtain an intra-group de-interleaved MDCT spectrum.

Based on the group quantity and the group flag information, MDCT spectrum blocks belonging to a same group are determined. For example, the decoded MDCT spectrum is divided into eight blocks. The group quantity is equal to 2, and the group flag information groupIndicator is 1 1 1 0 0 0 0 1. If a quantity of bits whose flag value is 0 in the group flag information is 4, MDCT spectra of the first four blocks in the decoded MDCT spectra are one group and belong to a transient state group, and intra-group de-interleaving processing needs to be performed. If a quantity of bits whose flag value is 1 is 4, MDCT spectra of the last four blocks form a group and belong to a non-transient state group, and intra-group de-interleaving processing needs to be performed. MDCT spectra of eight blocks obtained through intra-group de-interleaving processing are MDCT spectra of the eight blocks obtained through intra-group de-interleaving processing.

S45: Perform inverse grouping and arranging on the intra-group de-interleaved MDCT spectra based on the group quantity and the group flag information, to obtain an inverse grouping arranged MDCT spectrum.

The MDCT spectra obtained through intra-group de-interleaving processing are sorted, based on the group flag information groupIndicator, into spectra of M blocks sorted according to a time sequence.

For example, if the group quantity is equal to 2, and the group flag information groupIndicator is 1 1 1 0 0 0 0 1, the MDCT spectrum of the 0th block obtained through intra-group de-interleaving processing needs to be adjusted to the MDCT spectrum of the 3rd block (an element location index corresponding to the first bit whose flag value is 0 in the group flag information is 3). The MDCT spectrum of the 1st block obtained through intra-group de-interleaving processing is adjusted to the MDCT spectrum of the 4th block (an element location index corresponding to the second bit whose flag value is 0 in the group flag information is 4). The MDCT spectrum of the 2nd block obtained through intra-group de-interleaving processing is adjusted to the MDCT spectrum of the 5th block (an element location index corresponding to the third bit whose flag value is 0 in the group flag information is 5). The MDCT spectrum of the 3rd block obtained through intra-group de-interleaving processing is adjusted to the MDCT spectrum of the 6th block (an element location index corresponding to the fourth bit whose flag value is 0 in the group flag information is 6). The MDCT spectrum in the 4th block obtained through intra-group de-interleaving processing is adjusted to the MDCT spectrum of the 0th block (an element location index corresponding to the first bit whose flag value is 1 in the group flag information is 0). The MDCT spectrum of the 5th block obtained through intra-group de-interleaving processing is adjusted to the MDCT spectrum of the 1st block (an element location index corresponding to the second bit whose flag value is 1 in the group flag information is 1). The 6th MDCT spectrum obtained through intra-group de-interleaving processing is adjusted to the 2nd MDCT spectrum (an element location index corresponding to the third bit whose flag value is 1 in the group flag information is 2). The 7th MDCT spectrum obtained through intra-group de-interleaving processing is directly used as the 7th MDCT spectrum without adjustment.

At the encoder side, a spectrum form of the short frame after the spectra are grouped and arranged is as follows: Block index 3 4 5 6 0 1 2 7.

At the decoder side, spectra of the short frame after the inverse grouping and arranging processing are restored to spectra of eight blocks sorted in time sequence of the eight short frames: Block index 0 12 3 4 5 6 7.

S46: Interleave the inverse grouping arranged MDCT spectrum, to obtain an interleaved MDCT spectrum.

If the window type of the current frame is the short window, interleaving processing is performed on the MDCT spectrum after the inverse grouping and arranging processing, and the method is the same as that described above.

S47: Perform decoding post-processing on the interleaved MDCT spectrum to obtain a decoding post-processed MDCT spectrum.

Post-decoding processing may include processing like BWE inverse processing, TNS inverse processing, FDNS inverse processing, and the like.

S48: De-interleave the decoding post-processed MDCT spectrum to obtain a reconstructed MDCT spectrum.

S49: Perform inverse MDCT transformation and windowing on the reconstructed MDCT spectrum to obtain a reconstructed audio signal.

The reconstructed MDCT spectrum includes MDCT spectra of M blocks, and inverse MDCT transformation is performed on each block of MDCT spectrum. After windowing and overlapping addition processing are performed on an inversely transformed signal, a reconstructed audio signal of the short frame can be obtained.

S410: If the window type of the current frame is another window type, decoding is performed according to a decoding method corresponding to another type of frame, to obtain the reconstructed audio signal.

For example, a reconstructed MDCT spectrum is obtained by decoding a received bitstream by using the decoding neural network. Inverse transformation and OLA are performed based on the window type (e.g., a long window, a cut-in window, a cut-out window, etc.), and the reconstructed audio signal is obtained.

According to the method provided in this embodiment of this application, if the window type of the current frame is the short window, the group quantity and the group flag information of the current frame are obtained based on the spectra of the M blocks of the current frame. The spectra of the M blocks of the current frame are grouped and arranged based on the group quantity and the group flag information of the current frame, to obtain an audio signal after arranging and grouping. An encoding neural network is used to encode the spectrum after grouping and arranging. It can be ensured that when the audio signal of the current frame is a transient state signal, an MDCT spectrum including a transient state feature can be adjusted to a location with a higher encoding importance, so that the transient state feature can be better retained in an audio signal reconstructed after encoding and decoding processing by using the neural network.

This embodiment of this application may alternatively be used for stereo encoding. A difference lies in that: First, an intra-group interleaved MDCT spectrum of a left channel and an intra-group interleaved MDCT spectrum of a right channel are obtained after the left channel and the right channel of the stereo are separately processed by the encoder side according to operations S31 to 310 in the foregoing embodiment. Then, operation S311 is changed as follows: encoding the intra-group interleaved MDCT spectrum of the left channel and the intra-group interleaved MDCT spectrum of the right channel by using the encoding neural network.

An input of the encoding neural network is no longer an intra-group interleaved MDCT spectrum of a mono channel, but the intra-group interleaved MDCT spectrum of the left channel and the intra-group interleaved MDCT spectrum of the right channel obtained after the left channel and right channel of the stereo are separately processed according to operations S31 to 310.

The encoding neural network may be a CNN network, and the intra-group interleaved MDCT spectrum of the left channel and the intra-group interleaved MDCT spectrum of the right channel are used as inputs of two channels of the CNN network.

Correspondingly, the process executed by the decoder side includes:

- decoding the received bitstream to obtain a window type of the left channel of the current frame, the group quantity, and the group flag information;
- decoding the received bitstream to obtain a window type of the right channel of the current frame, the group quantity, and the group flag information;
- decoding the received bitstream and using the decoding neural network, to obtain a decoded MDCT spectrum of the stereo;
- performing processing according to the operation of mono decoding at the decoder side according to the embodiment 1 based on the window type of the left channel of the current frame, the group quantity, and the group flag information and the MDCT spectrum of the decoded left channel, to obtain a reconstructed left-channel signal; and
- performing processing according to the operation of mono decoding at the decoder side according to the embodiment 1 based on the window type of the right channel of the current frame, the group quantity, the group flag information, and the MDCT spectrum of the decoded right channel, to obtain a reconstructed right-channel signal.

It should be noted that, for brief description, the foregoing method embodiments are represented as a series of actions. However, a person skilled in the art should appreciate that this application is not limited to the described order of the actions, because according to this application, some operations may be performed in other orders or simultaneously. It should be further appreciated by a person skilled in the art that embodiments described in this specification all belong to example embodiments, and the involved actions and modules are not necessarily required by this application.

To better implement the foregoing solutions in the embodiments of this application, the following further provides a related apparatus for implementing the foregoing solutions.

Figure 10:
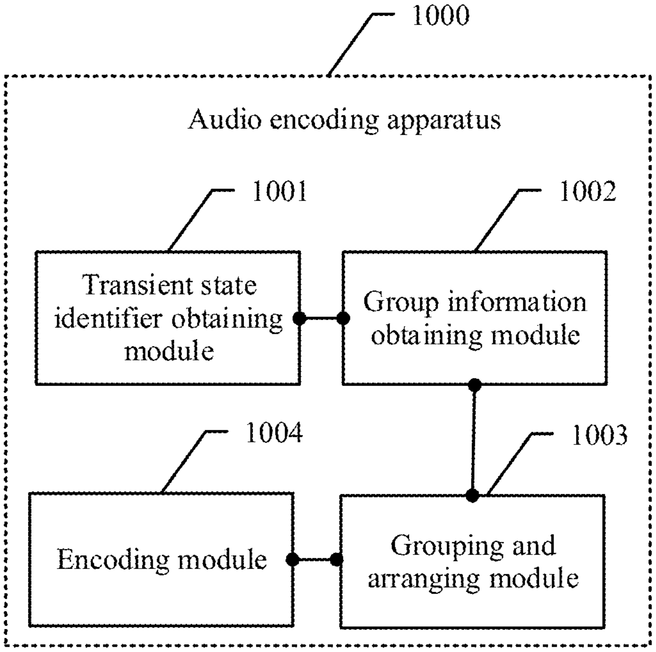
FIG. 10 is a schematic diagram of a composition structure of an audio encoding apparatus according to an embodiment of this application.

Refer to FIG. 10. An audio encoding apparatus 1000 provided in an embodiment of this application may include: a transient state identifier obtaining module 1001, a group information obtaining module 1002, a grouping arranging module 1003, and an encoding module 1004.

The transient state identifier obtaining module is configured to obtain M transient state identifiers of M blocks based on spectra of the M blocks of a current frame of a to-be-encoded audio signal, and the M blocks include a first block, and a transient state identifier of the first block indicates that the first block is a transient state block, or indicates that the first block is a non-transient state block.

The group information obtaining module is configured to obtain group information of the M blocks based on the M transient state identifiers of the M blocks.

The grouping and arranging module is configured to group and arrange the spectra of the M blocks based on the group information of the M blocks, to obtain a to-be-encoded spectrum of the current frame.

The encoding module is configured to encode the to-be-encoded spectrum by using an encoding neural network to obtain a spectrum encoding result; and write the spectrum encoding result into a bitstream.

Figure 11:
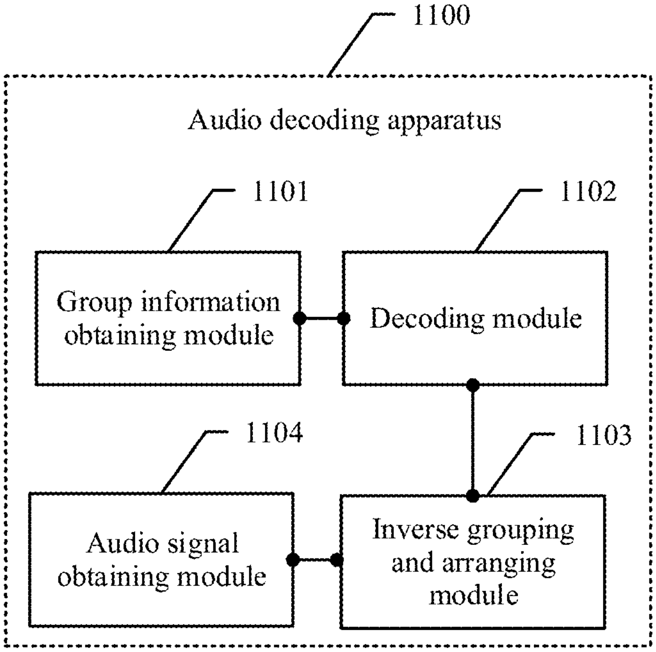
FIG. 11 is a schematic diagram of a composition structure of an audio decoding apparatus according to an embodiment of this application.

Refer to FIG. 11. An audio decoding apparatus 1100 provided in an embodiment of this application may include: a group information obtaining module 1101, a decoding module 1102, an inverse grouping and arranging module 1103, and an audio signal obtaining module 1104.

The group information obtaining module is configured to obtain group information of M blocks of a current frame of an audio signal from a bitstream, where the group information indicates M transient state identifiers of the M blocks.

The decoding module is configured to decode the bitstream by using a decoding neural network, to obtain decoded spectra of the M blocks.

The inverse grouping and arranging module is configured to perform inverse grouping and arranging on the decoded spectra of the M blocks based on the group information of the M blocks, to obtain spectra of the M blocks on which the inverse grouping processing is performed.

The audio signal obtaining module is configured to obtain a reconstructed audio signal of the current frame based on the spectra of the M blocks on which the inverse grouping processing is performed.

It should be noted that, content such as information exchange between the modules/units of the apparatus and the execution processes thereof is based on the same idea as the method embodiments of this application, and produces the same technical effects as the method embodiments of this application. For content, refer to the foregoing descriptions in the method embodiments of this application. Details are not described herein again.

An embodiment of this application further provides a computer storage medium. The computer storage medium stores a program, and the program performs a part or all of the operations described in the foregoing method embodiments.

Figure 12:
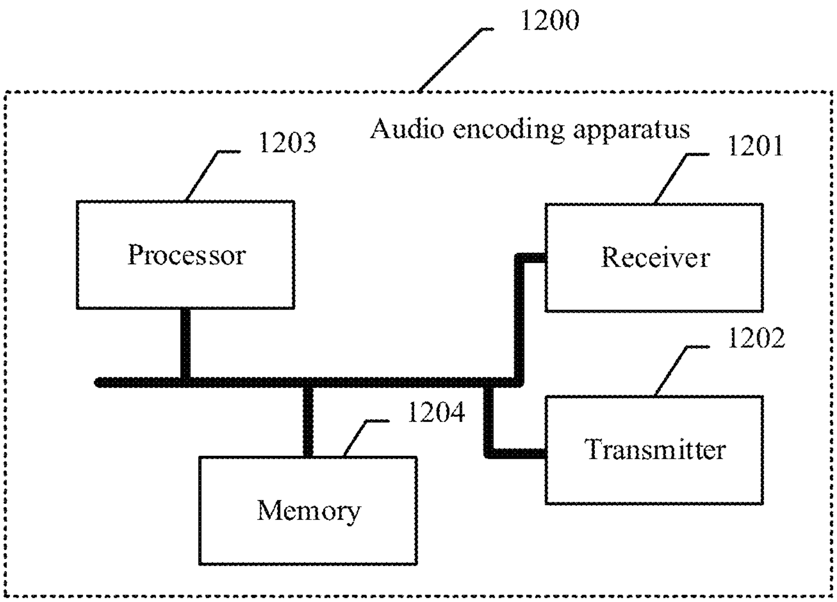
FIG. 12 is a schematic diagram of a composition structure of another audio encoding apparatus according to an embodiment of this application.

The following describes another audio encoding apparatus provided in an embodiment of this application. Refer to FIG. 12, an audio encoding apparatus 1200 includes:

a receiver 1201, a transmitter 1202, a processor 1203, and a memory 1204 (there may be one or more processors 1203 in the audio encoding apparatus 1200, and one processor is used as an example in FIG. 12). In some embodiments of this application, the receiver 1201, the transmitter 1202, the processor 1203, and the memory 1204 may be connected through a bus or in another manner. In FIG. 12, an example in which the receiver 1201, the transmitter 1202, the processor 1203, and the memory 1204 are connected through a bus is used.

The memory 1204 may include a read-only memory and a random access memory, and provide instructions and data for the processor 1203. A part of the memory 1204 may further include a non-volatile random access memory (NVRAM). The memory 1204 stores an operating system, an operation instruction, an executable module, or a data structure, or a subset thereof, or an extended set thereof. The operation instruction may include various operation instructions, and is used to implement various operations. The operating system may include various system programs, configured to implement various basic services and process hardware-based tasks.

The processor 1203 controls an operation of the audio encoding apparatus. The processor 1203 may also be referred to as a central processing unit (CPU). In one embodiment, components of the audio encoding apparatus are coupled together by using a bus system. In addition to a data bus, the bus system may further include a power bus, a control bus, a status signal bus, and the like. However, for clear description, various buses are referred to as the bus system in the figure.

The method disclosed in the foregoing embodiments of this application may be applied to the processor 1203, or may be implemented by the processor 1203. The processor 1203 may be an integrated circuit chip, and has a signal processing capability. In an embodiment, the operations of the method may be implemented by using an integrated logic circuit of hardware in the processor 1203 or an instruction in a form of software. The processor 1203 may be a general-purpose processor, a digital signal processor (DSP), an application-specific integrated circuit (ASIC), a field-programmable gate array (FPGA) or another programmable logic device, a discrete gate or a transistor logic device, or a discrete hardware component. It may implement or perform the methods, the operations, and logical block diagrams that are disclosed in embodiments of this application. The general-purpose processor may be a microprocessor, or the processor may be any conventional processor or the like. Operations of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1204, and the processor 1203 reads information in the memory 1204, and completes the operations of the foregoing method in combination with hardware of the processor.

The receiver 1201 may be configured to receive input digital or character information, and generate signal input related to related settings and function control of the audio encoding apparatus. The transmitter 1202 may include a display device like a display. The transmitter 1202 may be configured to output digital or character information by using an external interface.

In this embodiment of this application, the processor 1203 is configured to perform the methods performed by the audio encoding apparatus shown in FIG. 3, FIG. 6, and FIG. 8A and FIG. 8B in the foregoing embodiments.

Figure 13:
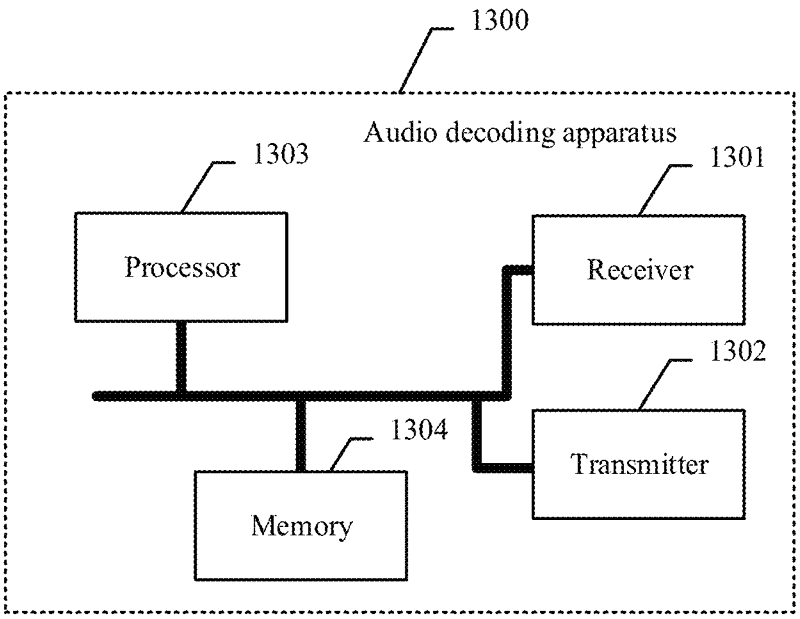
FIG. 13 is a schematic diagram of a composition structure of another audio decoding apparatus according to an embodiment of this application.

The following describes another audio decoding apparatus provided in an embodiment of this application. Refer to FIG. 13. An audio decoding apparatus 1300 includes:

a receiver 1301, a transmitter 1302, a processor 1303, and a memory 1304 (there may be one or more processors 1303 in the audio decoding apparatus 1300, and one processor is used as an example in FIG. 13). In some embodiments of this application, the receiver 1301, the transmitter 1302, the processor 1303, and the memory 1304 may be connected through a bus or in another manner. In FIG. 13, an example in which the receiver 1301, the transmitter 1302, the processor 1303, and the memory 1304 are connected through a bus is used.

The memory 1304 may include a read-only memory and a random access memory, and provide instructions and data for the processor 1303. A part of the memory 1304 may further include an NVRAM. The memory 1304 stores an operating system, an operation instruction, an executable module, or a data structure, or a subset thereof, or an extended set thereof. The operation instruction may include various operation instructions, and is used to implement various operations. The operating system may include various system programs, configured to implement various basic services and process hardware-based tasks.

The processor 1303 controls an operation of the audio decoding apparatus, and the processor 1303 may also be referred to as a CPU. In one embodiment, components of the audio decoding apparatus are coupled together by using a bus system. In addition to a data bus, the bus system may further include a power bus, a control bus, a status signal bus, and the like. However, for clear description, various buses are referred to as the bus system in the figure.

The method disclosed in the foregoing embodiments of this application may be applied to the processor 1303, or may be implemented by the processor 1303. The processor 1303 may be an integrated circuit chip, and has a signal processing capability. In an embodiment, the operations of the method may be implemented by using an integrated logic circuit of hardware in the processor 1303 or an instruction in a form of software. The processor 1303 may be a general-purpose processor, a DSP, an ASIC, an FPGA or another programmable logic device, a discrete gate or a transistor logic device, or a discrete hardware component. It may implement or perform the methods, the operations, and logical block diagrams that are disclosed in embodiments of this application. The general-purpose processor may be a microprocessor, or the processor may be any conventional processor or the like. Operations of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1304, and the processor 1303 reads information in the memory 1304, and completes the operations of the foregoing method in combination with hardware of the processor.

In this embodiment of this application, the processor 1303 is configured to perform the methods performed by the audio decoding apparatus shown in FIG. 4, FIG. 7, and FIG. 9A and FIG. 9B in the foregoing embodiments.

In another embodiment, when the audio encoding apparatus or the audio decoding apparatus is a chip in a terminal, the chip includes a processing unit and a communication unit. The processing unit may be, for example, a processor, and the communication unit may be, for example, an input/output interface, a pin, a circuit, or the like. The processing unit may execute a computer-executable instruction stored in the storage unit, so that the chip in the terminal performs the audio encoding method according to any one of the first aspect or the audio decoding method according to any one of the second aspect. In one embodiment, the storage unit is a storage unit in the chip, for example, a register or a cache. Alternatively, the storage unit may be a storage unit in the terminal and located outside the chip, for example, a read-only memory (ROM) or other types of static storage devices that may store static information and instructions, a random access memory (RAM), or the like.

The processor mentioned anywhere above may be a general-purpose central processing unit, a microprocessor, an ASIC, or one or more integrated circuits configured to control program execution of the method in the first aspect or the second aspect.

In addition, it should be noted that the described apparatus embodiment is merely an example. The units described as separate parts may or may not be physically separate, and parts displayed as units may or may not be physical units, may be located in one location, or may be distributed on a plurality of network units. Some or all of the modules may be selected based on actual requirements to achieve the objectives of the solutions of embodiments. In addition, in the accompanying drawings of the apparatus embodiments provided in this application, a connection relationship between modules indicates that there is a communication connection between the modules, and the communication connection may be implemented as one or more communication buses or signal cables.

Based on the description of the foregoing embodiments, a person skilled in the art may clearly understand that this application may be implemented by software in addition to universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in the form of a software product. The computer software product is stored in a readable storage medium, such as a floppy disk, a USB flash drive, a removable hard disk, a ROM, a RAM, a magnetic disk, or an optical disc of a computer, and includes several instructions that cause a computer device (which may be a personal computer, a server, a network device, or the like) to perform the methods described in the embodiments of this application.

All or some of the foregoing embodiments may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

What is claimed is:

1. An audio signal encoding method, comprising:

obtaining, based on a spectra of M blocks of a current frame of a to-be-encoded audio signal, M transient state identifiers of the M blocks, wherein the M blocks comprise a first block, and a transient state identifier of the first block indicates that the first block is a transient state block or a non-transient state block;

obtaining group information of the M blocks based on the M transient state identifiers of the M blocks;

performing grouping and arranging on the spectra of the M blocks based on the group information of the M blocks to obtain a to-be-encoded spectrum of the current frame;

encoding the to-be-encoded spectrum using an encoding neural network to obtain a spectrum encoding result; and writing the spectrum encoding result into a bitstream;

wherein the performing grouping and arranging on the spectra of the M blocks based on the group information of the M blocks to obtain the to-be-encoded spectrum of the current frame comprises:

allocating, to a transient state group, a spectrum of a block that is in the M blocks and that is indicated by the M transient state identifiers as a transient state block; allocating, to a non-transient state group, a spectrum of a block that is in the M blocks and that is indicated by the M transient state identifiers as a non-transient state block; and arranging the spectrum of the block allocated to the transient state group to be before the spectrum of the block allocated to the non-transient state group to obtain the to-be-encoded spectrum of the current frame; or arranging a spectrum of a block that is in the M blocks and that is indicated by the M transient state identifiers as a transient state block to be before a spectrum of a block that is in the M blocks and that is indicated by the M transient state identifiers as a non-transient state block to obtain the to-be-encoded spectrum of the current frame.

2. The method according to claim 1, wherein the method further comprises:

encoding the group information of the M blocks to obtain a group information encoding result; and writing the group information encoding result into the bitstream.

3. The method according to claim 1, wherein the group information of the M blocks comprises a group quantity or a group quantity identifier of the M blocks; the group quantity identifier indicates the group quantity; and when the group quantity is greater than 1, the group information of the M blocks further comprises the M transient state identifiers of the M blocks; or the group information of the M blocks comprises the M transient state identifiers of the M blocks.

4. The method according to claim 1, wherein before the encoding the to-be-encoded spectrum using the encoding neural network, the method further comprises:

performing intra-group interleaving on the to-be-encoded spectrum to obtain an intra-group interleaved spectra of the M blocks; and the encoding the to-be-encoded spectrum using the encoding neural network comprises:

encoding, using the encoding neural network, the intra-group interleaved spectra of the M blocks.

5. The method according to claim 4, wherein a quantity of P blocks that are in the M blocks and that are indicated by the M transient state identifiers as transient state blocks is P, a quantity of Q blocks that are in the M blocks and that are indicated by the M transient state identifiers as non-transient state blocks is Q, and M=P+Q;

the performing intra-group interleaving on the to-be-encoded spectrum comprises:

interleaving a spectra of the P blocks to obtain an interleaved spectra of the P blocks; and interleaving a spectra of the Q blocks to obtain an interleaved spectra of the Q blocks; and the encoding, using the encoding neural network, the intra-group interleaved spectra of the M blocks comprises:

encoding, using the encoding neural network, the interleaved spectra of the P blocks and the interleaved spectra of the Q blocks.

6. The method according to claim 1, wherein before the obtaining the M transient state identifiers of the M blocks based on the spectra of M blocks of the current frame of a to-be-encoded audio signal, the method further comprises:

obtaining a window type of the current frame, wherein the window type is a short window type or a non-short window type; and only when the window type is the short window type, performing the obtaining the M transient state identifiers of the M blocks based on the spectra of M blocks of a current frame of the to-be-encoded audio signal.

7. The method according to claim 6, wherein the method further comprises:

encoding the window type to obtain an encoding result of the window type; and writing the encoding result of the window type into the bitstream.

8. The method according to claim 1, wherein the obtaining the M transient state identifiers of the M blocks based on the spectra of M blocks of a current frame of the to-be-encoded audio signal comprises:

obtaining M pieces of spectrum energy of the M blocks based on the spectra of the M blocks;

obtaining an average spectrum energy value of the M blocks based on the M pieces of spectrum energy; and obtaining the M transient state identifiers of the M blocks based on the M pieces of spectrum energy and the average spectrum energy value.

9. The method according to claim 8, wherein when the spectrum energy of the first block is greater than K times of the average spectrum energy value, the transient state identifier of the first block indicates that the first block is a transient state block; or when the spectrum energy of the first block is less than or equal to K times of the average spectrum energy value, the transient state identifier of the first block indicates that the first block is a non-transient state block, wherein K is a real number greater than or equal to 1.

10. An audio signal encoding apparatus, comprising:

a memory that stores instructions; and at least one processor coupled to the memory, wherein the at least one processor executes the instructions to implement the method according to claim 1.

11. An audio signal decoding method, comprising:

obtaining group information of M blocks of a current frame of an audio signal from a bitstream, wherein the group information indicates M transient state identifiers of the M blocks;

decoding the bitstream using a decoding neural network to obtain a decoded spectra of the M blocks;

performing inverse grouping and arranging on the decoded spectra of the M blocks based on the group information of the M blocks to obtain an inverse grouping arranged spectra of the M blocks; and obtaining a reconstructed audio signal of the current frame based on the inverse grouping arranged spectra of the M blocks;

wherein the group information indicates a transient state identifier or a non-transient state identifier, wherein a spectrum of a block in the M blocks corresponds to the transient state identifier is arranged before a spectrum of a block in the M blocks corresponds to the non-transient state identifier in the bitstream.

12. The method according to claim 11, wherein before the performing inverse grouping and arranging on the decoded spectra of the M blocks based on the group information of the M blocks, the method further comprises:

performing intra-group de-interleaving on the decoded spectra of the M blocks to obtain an intra-group de-interleaved spectra of the M blocks; and the performing inverse grouping and arranging on the decoded spectra of the M blocks based on the group information of the M blocks comprises:

performing the inverse grouping and arranging on the intra-group de-interleaved spectra of the M blocks based on the group information of the M blocks.

13. The method according to claim 12, wherein a quantity of P blocks that are in the M blocks and that are indicated by the M transient state identifiers as transient state blocks is P, a quantity of Q blocks that are in the M blocks and that are indicated by the M transient state identifiers as non-transient state blocks is Q, and M=P+Q; and the performing the intra-group de-interleaving on the decoded spectra of the M blocks comprises:

de-interleaving the decoded spectra of the P blocks; and de-interleaving the decoded spectra of the Q blocks.

14. The method according to claim 11, wherein a quantity of P blocks that are in the M blocks and that are indicated by the M transient state identifiers as transient state blocks is P, a quantity of Q blocks that are in the M blocks and that are indicated by the M transient state identifiers as non-transient state blocks is Q, and M=P+Q; and the performing inverse grouping and arranging on the decoded spectra of the M blocks based on the group information of the M blocks comprises:

obtaining indexes of the P blocks based on the group information of the M blocks;

obtaining indexes of the Q blocks based on the group information of the M blocks; and performing the inverse grouping and arranging on the decoded spectra of the M blocks based on the indexes of the P blocks and the indexes of the Q blocks.

15. The method according to claim 11, wherein the method further comprises:

obtaining a window type of the current frame from the bitstream, wherein the window type is a short window type or a non-short window type; and only when the window type of the current frame is the short window type, performing the obtaining the group information of M blocks of the current frame from the bitstream.

16. An audio signal decoding apparatus, comprising:

a memory that stores instructions; and at least one processor coupled to the memory, wherein the at least one processor executes the instructions to implement the method according to claim 11.

17. A non-transitory computer-readable storage medium, having instructions stored thereon which, when executed by at least one processor, cause the at least one processor to perform the method according to claim 11.

18. A non-transitory computer-readable storage medium, comprising a bitstream stored thereon, wherein the bitstream is generated by the method comprising:

obtaining, based on a spectra of M blocks of a current frame of a to-be-encoded audio signal, M transient state identifiers of the M blocks, wherein the M blocks comprise a first block, and a transient state identifier of the first block indicates that the first block is a transient state block or a non-transient state block;

obtaining group information of the M blocks based on the M transient state identifiers of the M blocks;

performing grouping and arranging on the spectra of the M blocks based on the group information of the M blocks to obtain a to-be-encoded spectrum of the current frame;

encoding the to-be-encoded spectrum using an encoding neural network to obtain a spectrum encoding result; and writing the spectrum encoding result into a bitstream;

wherein the performing grouping and arranging on the spectra of the M blocks based on the group information of the M blocks to obtain the to-be-encoded spectrum of the current frame comprises:

allocating, to a transient state group, a spectrum of a block that is in the M blocks and that is indicated by the M transient state identifiers as a transient state block; allocating, to a non-transient state group, a spectrum of a block that is in the M blocks and that is indicated by the M transient state identifiers as a non-transient state block; and arranging the spectrum of the block allocated to the transient state group to be before the spectrum of the block allocated to the non-transient state group to obtain the to-be-encoded spectrum of the current frame; or arranging a spectrum of a block that is in the M blocks and that is indicated by the M transient state identifiers as a transient state block to be before a spectrum of a block that is in the M blocks and that is indicated by the M transient state identifiers as a non-transient state block to obtain the to-be-encoded spectrum of the current frame.

* * * * *